(12) United States Patent
Toyoda et al.

(10) Patent No.: US 12,054,586 B2
(45) Date of Patent: Aug. 6, 2024

(54) SYSTEM AND METHOD FOR MANUFACTURING POLYAMIC ACID, AND SYSTEM AND METHOD FOR MANUFACTURING POLYIMIDE

(71) Applicant: KANEKA CORPORATION, Osaka (JP)

(72) Inventors: Tomoyuki Toyoda, Shiga (JP); Toshihisa Itoh, Shiga (JP); Hiroyuki Furutani, Shiga (JP); Kazuhiro Shimizu, Shiga (JP); Kiyoshi Yamaguchi, Shiga (JP)

(73) Assignee: KANEKA CORPORATION, Osaka (JP)

( * ) Notice: Subject to any disclaimer, the term of this patent is extended or adjusted under 35 U.S.C. 154(b) by 992 days.

(21) Appl. No.: 16/976,579

(22) PCT Filed: Feb. 14, 2019

(86) PCT No.: PCT/JP2019/005426
§ 371 (c)(1),
(2) Date: Aug. 28, 2020

(87) PCT Pub. No.: WO2019/167655
PCT Pub. Date: Sep. 6, 2019

(65) Prior Publication Data
US 2021/0002427 A1  Jan. 7, 2021

(30) Foreign Application Priority Data

| Mar. 1, 2018 | (JP) | 2018-036465 |
| Mar. 1, 2018 | (JP) | 2018-036466 |
| Mar. 30, 2018 | (JP) | 2018-069418 |
| Mar. 30, 2018 | (JP) | 2018-069715 |
| Mar. 30, 2018 | (JP) | 2018-069746 |

(51) Int. Cl.
*C08G 73/10* (2006.01)

(52) U.S. Cl.
CPC ..... *C08G 73/1028* (2013.01); *C08G 73/1014* (2013.01); *C08G 73/1017* (2013.01)

(58) Field of Classification Search
CPC .......... C08G 73/10; C08G 73/1003; C08G 73/1007; C08J 2379/08
See application file for complete search history.

(56) References Cited

U.S. PATENT DOCUMENTS

2017/0022300 A1 * 1/2017 Hirahara ............. B01J 19/0066

FOREIGN PATENT DOCUMENTS

| CN | 106905527 A | * | 6/2017 |
| JP | S62214912 A | | 9/1987 |
| JP | S63-208560 A | | 8/1988 |
| JP | S64-16832 A | | 1/1989 |
| JP | 2741208 B2 | | 4/1998 |
| JP | H11-060668 A | | 3/1999 |
| JP | 2003-128745 A | | 5/2003 |
| JP | 2006249380 A | | 9/2006 |
| JP | WO 2015093611 | * | 6/2015 |

OTHER PUBLICATIONS

International Search Report issued in International Application No. PCT/JP2019/005426, mailed May 14, 2019 (2 pages).
Written Opinion issued in International Application No. PCT/JP2019/005426, mailed May 14, 2019 (4 pages).

* cited by examiner

*Primary Examiner* — Gregory Listvoyb
(74) *Attorney, Agent, or Firm* — Osha Bergman Watanabe & Burton LLP

(57) ABSTRACT

A polyamic acid manufacturing system for manufacturing a polyamic acid is disclosed using, as raw materials, a first solution in which a polyaddition-type first polymerizable compound is dissolved and a second solution in which a polyaddition-type second polymerizable compound that reacts with the first polymerizable compound through polyaddition is dissolved. The polyamic acid manufacturing system may include: a first supply part for supplying the first solution; a second supply part for supplying the second solution; a first combining part; and a first reaction part, thereby producing a first polymerization solution in which the polyamic acid is dissolved. Further, the polyamic acid manufacturing system may include: a first supply step of supplying the first solution; a second supply step of supplying the second solution; a first combining step; and a first reaction step, thereby producing a first polymerization solution in which the polyamic acid is dissolved.

8 Claims, 22 Drawing Sheets

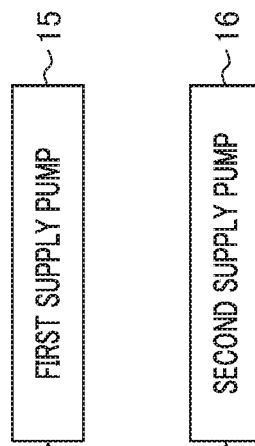
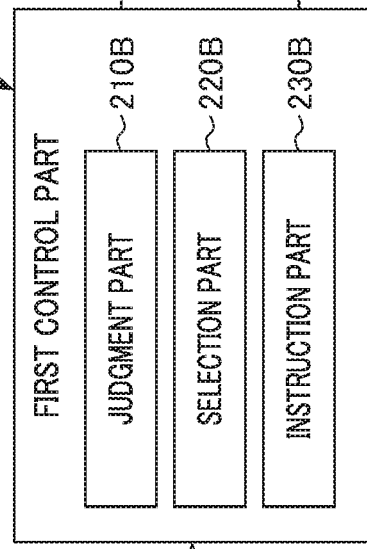
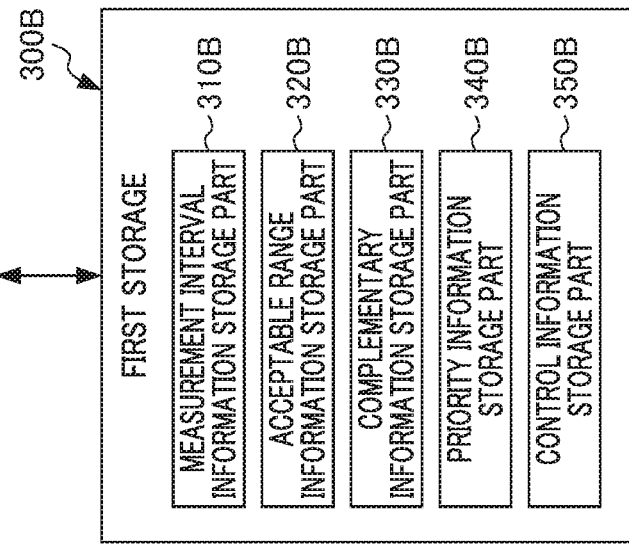
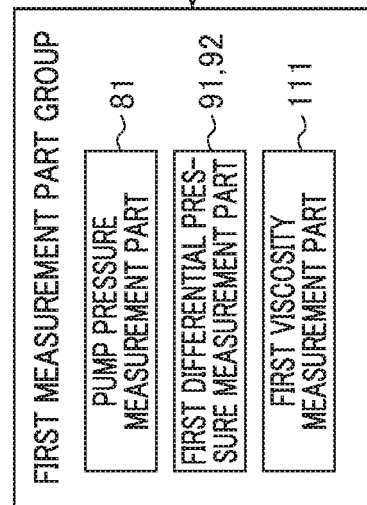
FIG. 6

SYSTEM AND METHOD FOR MANUFACTURING POLYAMIC ACID, AND SYSTEM AND METHOD FOR MANUFACTURING POLYIMIDE

TECHNICAL FIELD

The present invention relates to a polyamic acid manufacturing system and a polyamic acid manufacturing method for manufacturing a polyamic acid, which is a precursor of a polyimide, and to a polyimide manufacturing system and a polyimide manufacturing method for manufacturing a polyimide. More particularly, the present invention relates to a polyamic acid manufacturing system and a polyamic acid manufacturing method by which a polyamic acid can be continuously manufactured and to a polyimide manufacturing system and a polyimide manufacturing method by which a polyimide can be continuously manufactured.

BACKGROUND ART

A batch manufacturing method that utilizes a mixing vessel has been known as a polyamic acid manufacturing method. In a batch manufacturing method, a raw material solution in a mixing vessel is stirred to cause a polymerization reaction, but the gas phase in the upper portion of the mixing vessel is mixed with the liquid phase by the stirring and generates bubbles in the polymerization solution. Bubbles in the polymerization solution form film defects when the polymerization solution is casted to form a polyimide film by using a polyamic acid. Bubbles in the polymerization solution cause great quality problems.

To address these problems, for example, an efficient method for degassing a polymerization solution is proposed (see Patent Document 1, for example). However, a method disclosed in Patent Document 1 needs pressure reducing equipment, which sometimes requires considerable costs for operation. This method sometimes requires a long degassing time and has low productivity.

For example, a method for producing polyamic acid (polyamide acid) fine particles with a tubular reactor, such as a tube reactor, is known as a continuous polyamic acid manufacturing method (see Patent Document 2, for example).

Patent Document 1: Japanese Patent No. 2741208
Patent Document 2: Japanese Unexamined Patent Application, Publication No. 2006-249380

DISCLOSURE OF THE INVENTION

Problems to be Solved by the Invention

As described above, the batch manufacturing method that utilizes a mixing vessel has bubbling problems. In contrast, the use of a tubular reactor, such as a tube reactor, as in the method disclosed in Patent Document 2 causes fewer bubbling problems.

Although the method disclosed in Patent Document 2 is suitable for the manufacture of polyamic acid fine particles, it is difficult to consistently manufacture a desired polyamic acid dissolved in a solution by the method.

It is an object of the present invention to provide a polyamic acid manufacturing system and a polyamic acid manufacturing method by which a polyamic acid can be continuously and consistently manufactured with fewer bubbles. It is another object of the present invention to provide a polyimide manufacturing system and a polyimide manufacturing method by which a polyimide can be continuously and consistently manufactured with fewer bubbles.

Means for Solving the Problems

Specific means to solve the above problems include the following aspects.

<1> A polyamic acid manufacturing system for manufacturing a polyamic acid using, as raw materials, a first solution in which a polyaddition-type first polymerizable compound is dissolved and a second solution in which a polyaddition-type second polymerizable compound that reacts with the first polymerizable compound through polyaddition is dissolved, the polyamic acid manufacturing system including:
a first supply part for supplying the first solution;
a second supply part for supplying the second solution;
a first combining part for producing a first combined solution by combining the first solution and the second solution; and a first reaction part for mixing the first combined solution not in contact with gas to cause a polymerization reaction between the first polymerizable compound and the second polymerizable compound, thereby producing a first polymerization solution in which the polyamic acid is dissolved.

<2> The polyamic acid manufacturing system according to <1>, further including a first control part for controlling supply of the first solution and/or the second solution.

<3> The polyamic acid manufacturing system according to <2>, further including:
a first measurement part for acquiring one or two or more pieces of first reaction information about a physical quantity and/or a composition in at least one of the first solution, the second solution, the first combined solution, and the first polymerization solution,
wherein the first control part controls supply in the first supply part and/or the second supply part based on the first reaction information acquired by the first measurement part.

<4> The polyamic acid manufacturing system according to <3>, wherein the first measurement part includes one or two or more selected from the group consisting of viscometers, pressure gauges, pump pressure gauges, absorption spectrometers, infrared spectrometers, near-infrared spectrometers, densitometers, color difference meters, refractometers, spectrophotometers, electrical conductivity meters, turbidimeters, and X-ray fluorescence spectrometers.

<5> The polyamic acid manufacturing system according to any one of <2> to <4>, wherein the first control part controls flow rate variations of the first solution and/or the second solution to decrease a difference between the flow rate variation of the first solution and the flow rate variation of the second solution.

<6> The polyamic acid manufacturing system according to <5>, wherein the first control part synchronously controls the flow rate variation of the first solution and the flow rate variation of the second solution.

<7> The polyamic acid manufacturing system according to any one of <2> to <6>, wherein the first control part controls the flow rate variation of the first solution to the first threshold or below and controls the flow rate variation of the second solution to the second threshold or below.

<8> The polyamic acid manufacturing system according to any one of <1> to <7>, wherein the first reaction part includes a static-type mixer.

<9> The polyamic acid manufacturing system according to any one of <1> to <8>, wherein one of the first polymerizable compound and the second polymerizable compound is a tetracarboxylic dianhydride, and the other is a diamine.

<10> The polyamic acid manufacturing system according to any one of <1> to <8>, wherein one of the first polymerizable compound and the second polymerizable compound is a polyamic acid with a terminal acid anhydride group or a terminal amino group, and the other is a diamine or a tetracarboxylic dianhydride.

<11> The polyamic acid manufacturing system according to any one of <1> to <9>, wherein the polyamic acid in the first polymerization solution is a polyamic acid with a terminal acid anhydride group or a terminal amino group, the polyamic acid manufacturing system further including:
- a third supply part for supplying a third solution in which a diamine or tetracarboxylic dianhydride is dissolved, the diamine or tetracarboxylic dianhydride being capable of reacting through polyaddition with the polyamic acid with the terminal acid anhydride group or the terminal amino group contained in the first polymerization solution;
- a second combining part for producing a second combined solution by combining the first polymerization solution and the third solution; and
- a second reaction part for mixing the second combined solution not in contact with gas to cause a polymerization reaction between the polyamic acid with the terminal acid anhydride group or the terminal amino group of the first polymerization solution and the diamine or tetracarboxylic dianhydride of the third solution in the second combined solution, thereby producing a second polymerization solution in which the polyamic acid is dissolved.

<12> A polyimide manufacturing system including: the polyamic acid manufacturing system according to any one of <1> to <11>; and an imidization part for imidizing a polyamic acid manufactured by the polyamic acid manufacturing system.

<13> A polyamic acid manufacturing method for manufacturing a polyamic acid using, as raw materials, a first solution in which a polyaddition-type first polymerizable compound is dissolved and a second solution in which a polyaddition-type second polymerizable compound that reacts with the first polymerizable compound through polyaddition is dissolved, the polyamic acid manufacturing system including: a first supply step of supplying the first solution; a second supply step of supplying the second solution; a first combining step of producing a first combined solution by combining the first solution and the second solution; and a first reaction step of mixing the first combined solution not in contact with gas to cause a polymerization reaction between the first polymerizable compound and the second polymerizable compound, thereby producing a first polymerization solution in which the polyamic acid is dissolved.

<14> The polyamic acid manufacturing method according to <13>, further including a first control step of controlling supply of the first solution and/or the second solution.

<15> The polyamic acid manufacturing method according to <14>, further including a first measurement step of acquiring one or two or more pieces of first reaction information about a physical quantity and/or a composition in at least one of the first solution, the second solution, the first combined solution, and the first polymerization solution, wherein the first control step controls supply in the first supply step and/or the second supply step based on the first reaction information acquired in the first measurement step.

<16> The polyamic acid manufacturing method according to <15>, wherein the first reaction information in the first measurement step is acquired with one or two or more selected from the group consisting of viscometers, pressure gauges, pump pressure gauges, absorption spectrometers, infrared spectrometers, near-infrared spectrometers, densitometers, color difference meters, refractometers, spectrophotometers, electrical conductivity meters, turbidimeters, and X-ray fluorescence spectrometers.

<17> The polyamic acid manufacturing method according to any one of <14> to <16>, wherein flow rate variations of the first solution and/or the second solution are controlled in the first control step to decrease a difference between the flow rate variation of the first solution and the flow rate variation of the second solution.

<18> The polyamic acid manufacturing method according to <17>, wherein the flow rate variation of the first solution and the flow rate variation of the second solution are synchronously controlled in the first control step.

<19> The polyamic acid manufacturing method according to any one of <14> to <18>, wherein in the first control step, the flow rate variation of the first solution is controlled to the first threshold or below, and the flow rate variation of the second solution is controlled to the second threshold or below.

<20> The polyamic acid manufacturing method according to any one of <13> to <19>, wherein mixing with a static-type mixer is performed in the first reaction step.

<21> The polyamic acid manufacturing method according to any one of <13> to <20>, wherein one of the first polymerizable compound and the second polymerizable compound is a tetracarboxylic dianhydride, and the other is a diamine.

<22> The polyamic acid manufacturing method according to any one of <13> to <20>, wherein one of the first polymerizable compound and the second polymerizable compound is a polyamic acid with a terminal acid anhydride group or a terminal amino group, and the other is a diamine or a tetracarboxylic dianhydride.

<23> The polyamic acid manufacturing method according to any one of <13> to <22>, wherein the polyamic acid in the first polymerization solution is a polyamic acid with a terminal acid anhydride group or a terminal amino group, the polyamic acid manufacturing method further including:
a third supply step of supplying a third solution in which a diamine or tetracarboxylic dianhydride is dissolved, the diamine or tetracarboxylic dianhydride being capable of reacting through polyaddition with the polyamic acid with the terminal acid anhydride group or the terminal amino group contained in the first polymerization solution;
- a second combining step of producing a second combined solution by combining the first polymerization solution and the third solution; and
- a second reaction step of mixing the second combined solution not in contact with gas to cause a polymerization reaction between the polyamic acid with the terminal acid anhydride group or the terminal amino group of the first polymerization solution and the diamine or tetracarboxylic dianhydride of the third solution in the second combined solution, thereby producing a second polymerization solution in which the polyamic acid is dissolved.

<24> A polyimide manufacturing method including:
a polyamic acid manufacturing step of manufacturing a polyamic acid by the manufacturing method according to any one of <13> to <23>; and
an imidization step of imidizing the polyamic acid manufactured in the polyamic acid manufacturing step.

Effects of the Invention

The present invention can provide a polyamic acid manufacturing system and a polyamic acid manufacturing method by which a polyamic acid can be continuously and consistently manufactured with fewer bubbles. The present invention can also provide a polyimide manufacturing system and a polyimide manufacturing method by which a polyimide can be continuously and consistently manufactured with fewer bubbles.

BRIEF DESCRIPTION OF THE DRAWINGS

FIG. 6 is a block diagram of a polyamic acid manufacturing system according to the third embodiment.

PREFERRED MODE FOR CARRYING OUT THE INVENTION

Figure 1:
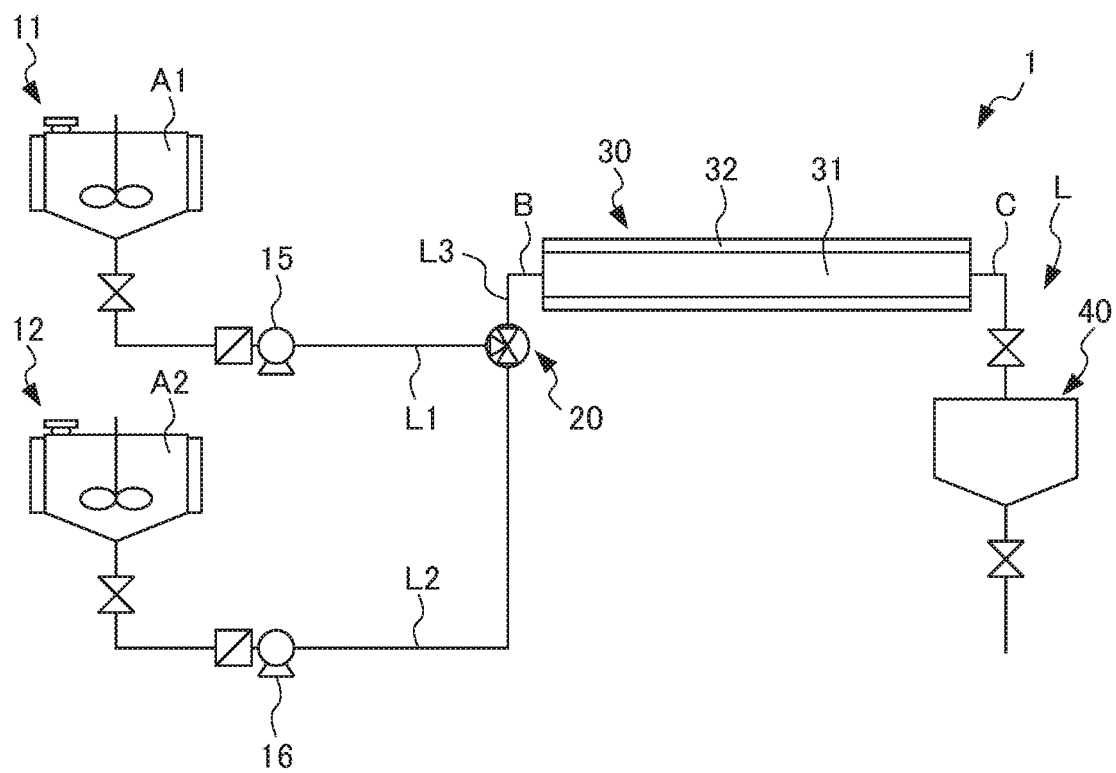
FIG. 1 is a schematic view of a polyamic acid manufacturing system according to a first embodiment.

Embodiments of the present invention are described in detail below with reference to the accompanying drawings.

First Embodiment

A polyamic acid manufacturing system according to a first embodiment is described below with reference to FIGS. 1 and 2. The polyamic acid manufacturing system in the first embodiment includes a single reaction part.

First, a polyamic acid manufacturing system 1 according to the first embodiment is outlined below with reference to FIG. 1. The polyamic acid manufacturing system 1 is a system for manufacturing a polyamic acid using, as raw materials, a first solution A1 in which a polyaddition-type first polymerizable compound is dissolved and a second solution A2 in which a polyaddition-type second polymerizable compound that reacts with the first polymerizable compound through polyaddition is dissolved.

In the following embodiment, by way of example, one of the first polymerizable compound and the second polymerizable compound is a tetracarboxylic dianhydride, and the other is a diamine. More specifically, the first polymerizable compound in the first solution A1 is the tetracarboxylic dianhydride, and the second polymerizable compound in the second solution A2 is the diamine.

The tetracarboxylic dianhydride may be, but is not limited to, one of those used in known polyimide syntheses. Specific examples of the tetracarboxylic dianhydride include aromatic tetracarboxylic dianhydrides, such as 3,3',4,4'-benzophenonetetracarboxylic dianhydride, 3,3',4,4'-biphenyltetracarboxylic dianhydride, 2,3,3',4'-biphenyltetracarboxylic dianhydride, pyromellitic dianhydride, 1,3-bis(2,3-dicarboxyphenoxy)benzene dianhydride, 1,4-bis(2,3-dicarboxyphenoxy)benzene dianhydride, 2,3,3',4'-benzophenonetetracarboxylic dianhydride, 2,2',3,3'-benzophenonetetracarboxylic dianhydride, 2,2',3,3'-biphenyltetracarboxylic dianhydride, 2,2',6,6'-biphenyltetracarboxylic dianhydride, naphthalene-1,2,4,5-tetracarboxylic dianhydride, anthracene-2,3,6,7-tetracarboxylic dianhydride, phenanthrene-1,8,9,10-tetracarboxylic dianhydride, and 2,2-bis(4-hydroxyphenyl) propane dibenzoate-3,3',4,4'-tetracarboxylic dianhydride; aliphatic tetracarboxylic dianhydrides, such as butane-1,2,3,4-tetracarboxylic dianhydride; alicyclic tetracarboxylic dianhydrides, such as cyclobutane-1,2,3,4-tetracarboxylic dianhydride; and heterocyclic tetracarboxylic dianhydrides, such as thiophene-2,3,4,5-tetracarboxylic dianhydride and pyridine-2,3,5,6-tetracarboxylic dianhydride. The tetracarboxylic dianhydrides may be used alone or in combination.

A solvent in the first solution A1 is a solvent that dissolves the tetracarboxylic dianhydride and the polyamic acid. Specific examples of the solvent include amide solvents, such as N,N-dimethylformamide, N,N-dimethylacetamide, N-methyl-2-pyrrolidone, 1,3-dimethyl-2-imidazolidinone, and acetanilide; cyclic ester solvents, such as γ-butyrolactone; chain ester solvents, such as ethyl acetate; ketone solvents, such as 2-propanone, 3-pentanone, acetone, and methyl ethyl ketone; ether solvents, such as tetrahydrofuran and dioxolane; alcohol solvents, such as methanol, ethanol, and isopropanol; and aromatic hydrocarbon solvents, such as toluene and xylene. Among these, amide solvents, cyclic ester solvents, and ether solvents are preferred due to their high ability to dissolve the polyamic acid. These solvents may be used alone or in combination. For example, mixing a solvent with relatively low ability to dissolve the polyamic acid, such as acetone, ethyl acetate, methyl ethyl ketone, toluene, or xylene, with a polar alcohol solvent can improve the ability to dissolve the polyamic acid.

The first solution A1 may contain a small amount of tertiary amine, such as trimethylamine or triethylamine, to increase the solubility of the tetracarboxylic dianhydride or to increase reactivity with the diamine.

The diamine may be, but is not limited to, one of those used in known polyimide syntheses. Specific examples of the diamine include aromatic diamines, such as 4,4'-diaminodiphenylmethane, 4,4'-diaminodiphenyl ether, 2,2-bis[4-(4-aminophenoxy)phenyl]propane, 4,4'-bis(4-aminophenoxy)biphenyl, 1,4'-bis(4-aminophenoxy)benzene, 1,3'-bis(4-aminophenoxy)benzene, o-phenylenediamine, m-phenylenediamine, p-phenylenediamine, 3,4'-diaminodiphenyl ether, 4,4'-diaminodiphenyl sulfone, 3,4'-diaminodiphenyl sulfone, 3,3'-diaminodiphenyl sulfone, 4,4'-methylene-bis(2-chloroaniline), 3,3'-dimethyl-4,4'-diaminobiphenyl, 4,4'-diaminodiphenyl sulfide, 2,6-diaminotoluene, 2,4-diaminochlorobenzene, 1,2-diaminoanthraquinone, 1,4-diaminoanthraquinone, 3,3'-diaminobenzophenone, 3,4'-diaminobenzophenone, 4,4'-diaminobenzophenone, and 4,4'-diaminobibenzyl; aliphatic diamines, such as 1,2-diaminoethane, 1,4-diaminobutane, tetramethylenediamine, and 1,10-diaminododecane; alicyclic diamines, such as 1,4-diaminocyclohexane, 1,2-diaminocyclohexane, bis(4-aminocyclohexyl)methane, and 4,4'-diaminodicyclohexylmethane; and heterocyclic diamines, such as 3,4-diaminopyridine. These diamines may be used alone or in combination.

A solvent in the second solution A2 is a solvent that dissolves the diamine and the polyamic acid. Specific examples of the solvent include amide solvents, such as N,N-dimethylformamide, N,N-dimethylacetamide, N-methyl-2-pyrrolidone, 1,3-dimethyl-2-imidazolidinone, and acetanilide; cyclic ester solvents, such as γ-butyrolactone; chain ester solvents, such as ethyl acetate; ketone solvents, such as 2-propanone, 3-pentanone, acetone, and methyl ethyl ketone; ether solvents, such as tetrahydrofuran and dioxolane; alcohol solvents, such as methanol, ethanol, and isopropanol; and aromatic hydrocarbon solvents, such as toluene and xylene. Among these, amide solvents, cyclic ester solvents, and ether solvents are preferred due to their high ability to dissolve the polyamic acid. These solvents may be used alone or in combination. For example, mixing a solvent with relatively low ability to dissolve the polyamic acid, such as acetone, ethyl acetate, methyl ethyl ketone, toluene, or xylene, with a polar alcohol solvent can improve the ability to dissolve the polyamic acid.

Figure 2:
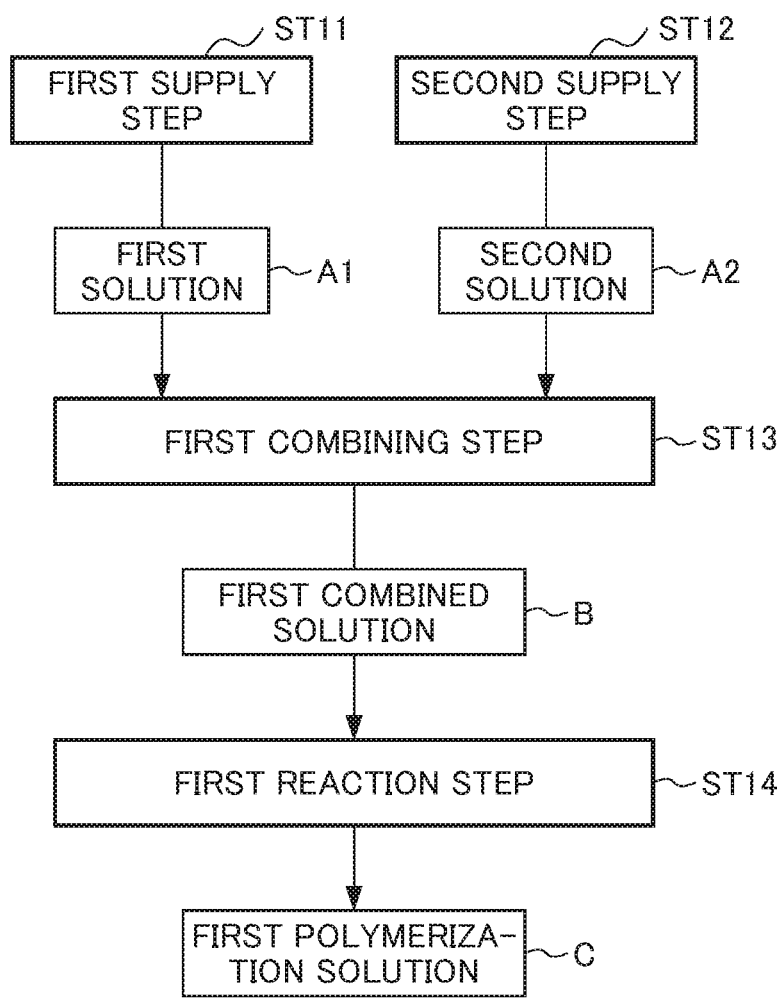
FIG. 2 is a flow chart of a polyamic acid manufacturing method according to the first embodiment.

The polyamic acid manufacturing system 1 illustrated in FIG. 1 is configured to produce the polyamic acid by combining the raw materials, the first solution A1 and the second solution A2, in the first combining part 20 to produce a first combined solution B and by causing a polymerization reaction in a first reaction part 30 to produce a first polymerization solution C.

The polyamic acid manufacturing system 1 has a tubular liquid transfer line L that hermetically connects a first tank 11 and a second tank 12 to a first cushion tank 40 as described later. Thus, the polyamic acid manufacturing system 1 can continuously manufacture the polyamic acid without bubbles in the first combined solution B or in the first polymerization solution C.

The specific structure of the polyamic acid manufacturing system 1 is described below. As illustrated in FIG. 1, the polyamic acid manufacturing system 1 includes the first tank 11, the second tank 12, a first supply pump 15 (first supply part), a second supply pump 16 (second supply part), the first combining part 20, the first reaction part 30, the first cushion tank 40, and the liquid transfer line L. The liquid transfer line L includes a first liquid transfer part L1, a second liquid transfer part L2, and a third liquid transfer part L3.

The first tank 11 contains the first solution A1 in which the polyaddition-type first polymerizable compound is dissolved. In the present embodiment, the first tank 11 contains the first solution A1 in which the tetracarboxylic dianhydride is dissolved. The first solution A1 in the first tank 11 is supplied to the first combining part 20 through the first liquid transfer part L1.

The second tank 12 contains the second solution A2 in which the polyaddition-type second polymerizable compound that reacts with the first polymerizable compound through polyaddition is dissolved. In the present embodiment, the second tank 12 contains the second solution A2 in which the diamine is dissolved. The second solution A2 in the second tank 12 is supplied to the first combining part 20 through the second liquid transfer part L2.

The first supply pump 15 (first supply part) supplies the first solution A1 contained in the first tank 11 to the first combining part 20. The first supply pump 15 supplies the first solution A1 in a specific feed rate. For example, the first supply pump 15 is controlled to supply the first solution A1 under the conditions for the production of a polyamic acid with desired properties.

The second supply pump 16 (second supply part) supplies the second solution A2 contained in the second tank 12 to the first combining part 20. The second supply pump 16 supplies the second solution A2 in a specific feed rate. For example, the second supply pump 16 is controlled to supply the second solution A2 under the conditions for the production of a polyamic acid with desired properties.

The first combining part 20 is located downstream of the first supply pump 15 and the second supply pump 16. The first solution A1 and the second solution A2 are combined in the first combining part 20 to produce the first combined solution B. The first combining part 20 includes a junction valve for combining the first solution A1 supplied from the first supply pump 15 with the second solution A2 supplied from the second supply pump 16.

The first polymerizable compound and the second polymerizable compound in the first combined solution B are polymerized in the first reaction part 30. In the first reaction part 30, the first polymerizable compound and the second polymerizable compound in the first combined solution B are gradually polymerized to produce the first polymerization solution C.

The first reaction part 30 is a double tube extending in a specific direction and includes a first reaction mixing part 31 on the inside and a first reaction temperature control part 32 on the outside. The first combined solution B flows through the first reaction part 30 in a desired residence time.

In the first reaction mixing part 31, the first combined solution B of the first solution A1 and the second solution A2 is mixed without being in contact with gas. In the present embodiment, the first combined solution B adjusted by the first reaction temperature control part 32 to a temperature suitable for the polymerization reaction in the first reaction mixing part 31 is mixed without being in contact with gas.

For example, the first reaction mixing part 31 includes a static-type mixer, such as a static mixer, a nozzle, or an orifice, or a driven mixer, such as a centrifugal pump, a volute pump, or an in-line mixer with impeller blades, preferably a static-type mixer, more preferably a static mixer. Although a tube with an inner twisted tape (see FIG. 19, etc. in Japanese Unexamined Patent Application Publication No. 2003-314982) has a mixing promoting effect similar to that of the static mixer, the static mixer has a higher mixing promoting effect and is therefore preferred.

The static mixer may be, but is not limited to, a Kenics mixer type, Sulzer SMV type, Sulzer SMX type, Tray Hi-mixer type, Komax mixer type, Lightnin mixer type, Ross ISG type, or Bran&Lube mixer type static mixer. Among these, a Kenics mixer type static mixer is more preferred due to its simple structure without a dead space.

The first reaction temperature control part 32 is a piping part outside the first reaction mixing part 31. The first reaction temperature control part 32 controls (for example, cools) the first combined solution B flowing through the first reaction mixing part 31 under desired temperature conditions. The first combined solution B is controlled at a temperature suitable for the polymerization reaction in the first reaction temperature control part 32 and flows through the first reaction mixing part 31.

The first cushion tank 40 receives the first polymerization solution C from the first reaction part 30. The first cushion tank 40 serves as a tank that holds a raw material solution, for example, in the production of a polyimide by imidization of a polyamic acid.

The polyamic acid manufacturing system 1 in the present embodiment may be part of a polyimide manufacturing system for manufacturing a polyimide. In such a case, the polyimide manufacturing system further includes an imidization part for imidizing a polyamic acid. In the imidization part (not shown), for example, a polyamic acid is imidized by a thermal imidization method for thermal cyclodehydration or by a chemical imidization method using a dehydrating agent and an imidization accelerator.

When the polyamic acid manufacturing system 1 in the present embodiment is part of a polyimide manufacturing system for manufacturing a polyimide, the first cushion tank 40 may be omitted, and the liquid may be transferred from the first reaction part 30 to the imidization part. The polyamic acid, however, is preferably temporarily held in the first cushion tank 40, as described above.

Next, a polyamic acid manufacturing method according to the first embodiment is described below with reference to FIG. 2. As illustrated in FIG. 2, in the first supply step ST11, the first supply pump 15 supplies the first solution A1 contained in the first tank 11 to the first combining part 20. At the same time, in the second supply step ST12, the second supply pump 16 supplies the second solution A2 contained in the second tank 12 to the first combining part 20.

Subsequently, in the first combining step ST13, the first solution A1 from the first supply pump 15 and the second solution A2 from the second supply pump 16 are combined in the first combining part 20 to produce the first combined solution B.

Subsequently, in the first reaction step ST14, the first polymerizable compound and the second polymerizable compound in the first combined solution B are polymerized in the first reaction part 30 to produce the first polymerization solution C in which the polyamic acid is dissolved. More specifically, the first combined solution B not in contact with gas adjusted by the first reaction temperature control part 32 to a temperature suitable for the polymerization reaction in the first reaction mixing part 31 is polymerized while mixing to produce the first polymerization solution C. When the first reaction mixing part 31 is a static-type mixer, such as a static mixer, the first combined solution B is mixed only by passing through the static-type mixer.

The polyamic acid manufacturing method in the present embodiment may be part of a polyimide manufacturing method. In such a case, the polyimide manufacturing method further includes an imidization step of imidizing a polyamic acid.

The polyamic acid manufacturing system 1 in the present embodiment has the following advantages.

The polyamic acid manufacturing system 1 includes the first reaction part 30 in which the first combined solution B of the first solution A1 and the second solution A2 not in contact with gas is mixed and produces the first polymerization solution C in which the polyamic acid is dissolved. Thus, the polyamic acid manufacturing system 1 can continuously and consistently manufacture a polyamic acid with fewer bubbles. More specifically, the polyamic acid manufacturing system 1 can continuously and consistently produce the first polymerization solution C in which the polyamic acid is dissolved, and can reduce bubbles in the first polymerization solution C.

In the polyamic acid manufacturing system 1, the first reaction part 30 may include a static-type mixer. For example, in the polyamic acid manufacturing system 1, the first reaction mixing part 31 in the first reaction part 30 may include a static-type mixer. In such a case, the first combined solution B can be mixed only by passing through the first reaction mixing part 31 in the polyamic acid manufacturing system 1.

Although one of the first polymerizable compound and the second polymerizable compound is a tetracarboxylic dianhydride, and the other is a diamine in the present embodiment, the present invention is not limited to this embodiment. For example, one of the first polymerizable compound and the second polymerizable compound may be a polyamic acid (prepolymer) with a terminal acid anhydride group or a terminal amino group, and the other may be a diamine or a tetracarboxylic dianhydride. In such a case, when one of the first polymerizable compound and the second polymerizable compound is a polyamic acid with a terminal acid anhydride group, the other is a diamine. Alternatively, when one of the first polymerizable compound and the second polymerizable compound is a polyamic acid with a terminal amino group, the other is a tetracarboxylic dianhydride.

Although the first reaction part 30 includes the double tube composed of the first reaction mixing part 31 and the first reaction temperature control part 32 in the present embodiment, the present invention is not limited to this embodiment. For example, the first reaction part 30 may be a single tube composed only of the first reaction mixing part 31, and the first reaction mixing part 31 may be immersed in a temperature control liquid.

Although the first tank 11 and the second tank 12 are hermetically connected to the first cushion tank 40 through the tubular liquid transfer line L in the present embodiment, the present invention is not limited to this embodiment. For example, to reduce bubbles in the first polymerization solution C, it is only necessary that the solution can be mixed without being in contact with gas in at least the first reaction part 30. As a matter of course, preferably, the solution is not in contact with gas throughout the liquid transfer line L, as described above.

Although the first combined solution B not in contact with gas is mixed in one reaction part (the first reaction part) in the present embodiment, the present invention is not limited to this embodiment. For example, the reaction part in which the first combined solution B not in contact with gas is mixed may include a pre-mixing part and a reaction mixing part immediately adjacent to the downstream side of the pre-mixing part. Like the first reaction part 30, the pre-mixing part and the reaction mixing part can include a static-type mixer. In such a case, the first combined solution B not in contact with gas is mixed in the pre-mixing part, and the solution mixed in the pre-mixing part is further mixed without being in contact with gas in the reaction mixing part, thus producing the first polymerization solution C. Such a polyamic acid manufacturing system can further improve the quality and yield of the polyamic acid produced.

Second Embodiment

Figure 3:
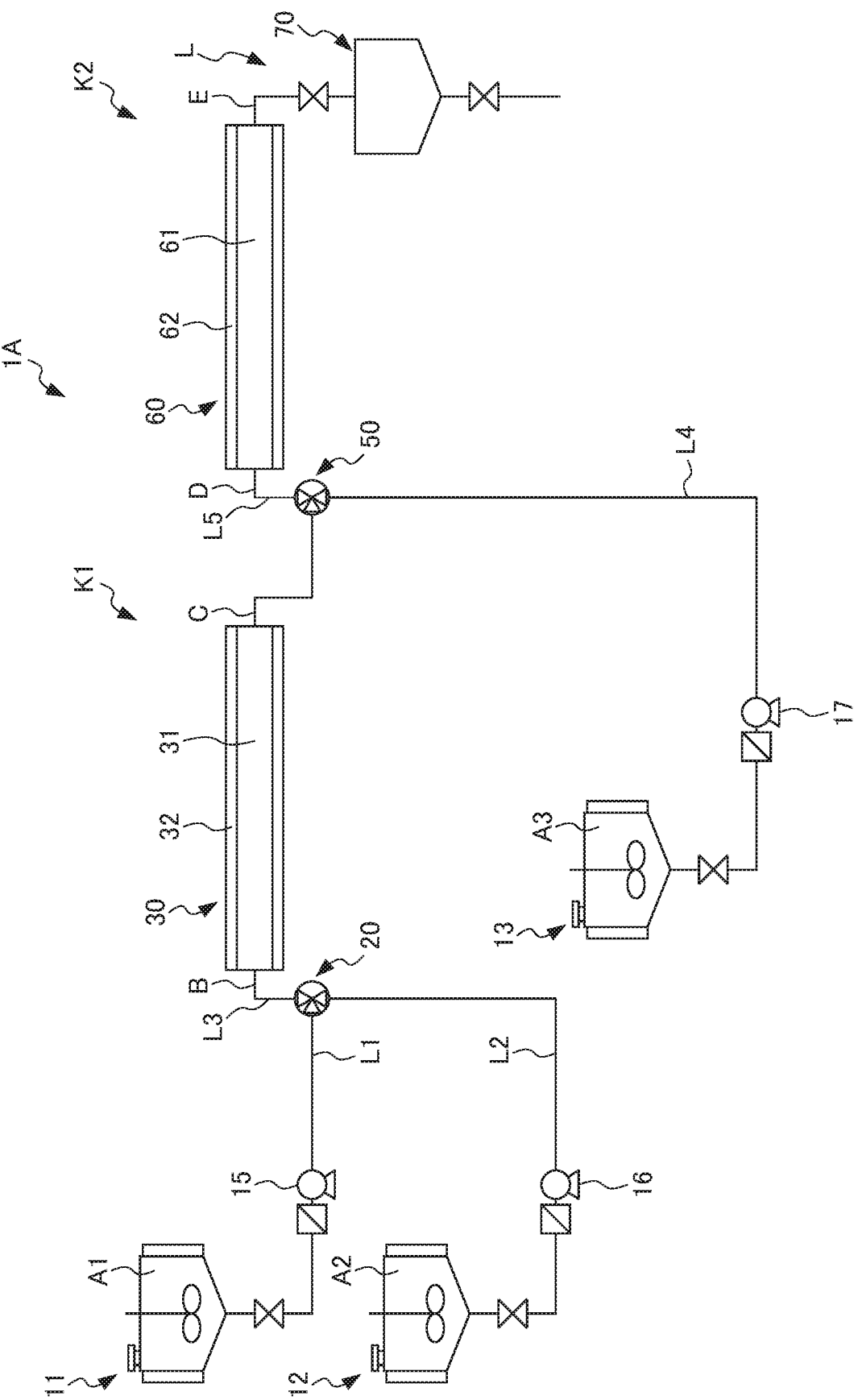
FIG. 3 is a schematic view of a polyamic acid manufacturing system according to a second embodiment.

A polyamic acid manufacturing system according to a second embodiment is described below with reference to FIGS. 3 and 4. The polyamic acid manufacturing system in the second embodiment includes double treatment parts (reaction parts).

First, a polyamic acid manufacturing system 1A according to the second embodiment is described below with reference to FIG. 3. As illustrated in FIG. 3, the polyamic acid manufacturing system 1A includes a first treatment part K1 and a second treatment part K2.

The first treatment part K1 is the same as in the polyamic acid manufacturing system 1 according to the first embodiment and is not described in detail in the present embodiment. The components and operation in the first treatment part K1 are as described in the first embodiment. The first polymerization solution C produced in the first treatment part K1 contains a polyamic acid (prepolymer) with a terminal acid anhydride group or a terminal amino group.

In the second treatment part K2, the raw materials, the first polymerization solution C produced in the first treatment part K1 (the polyamic acid manufacturing system 1 in the first embodiment) and a third solution A3, are polymerized to produce a polyamic acid (with a higher molecular weight). The second treatment part K2 is basically the same as the first treatment part K1 except that the polyamic acid is produced from the first polymerization solution C produced in the first treatment part K1.

The second treatment part K2 includes a third tank 13, a third supply pump 17 (a third supply part), a second combining part 50, a second reaction part 60, a second cushion tank 70, and a portion of the liquid transfer line L. The portion of the liquid transfer line L includes a fourth liquid transfer part L4 and a fifth liquid transfer part L5.

The third tank 13 contains the third solution A3 in which a diamine or tetracarboxylic dianhydride is dissolved, the diamine or tetracarboxylic dianhydride being capable of reacting through polyaddition with a polyamic acid with a terminal acid anhydride group or a terminal amino group contained in the first polymerization solution C. The third solution A3 in the third tank 13 is supplied to the second combining part 50 through the fourth liquid transfer part L4.

In the following embodiment, by way of example, the first polymerization solution C contains a polyamic acid with a terminal acid anhydride group, and the third solution A3 contains a diamine.

The third supply pump 17 (third supply part) supplies the third solution A3 contained in the third tank 13 to the second combining part 50. The third supply pump 17 supplies the third solution A3 in a specific feed rate. For example, the third supply pump 17 is controlled to supply the third solution A3 under the conditions for the production of a polyamic acid with desired properties. The feed rate of the third supply pump 17 may depend on the properties and composition of the first polymerization solution C. The feed rate of the third supply pump 17 may also depend on the reaction rate of the first polymerization solution C. In other words, the feed rate of the third supply pump 17 can be controlled to achieve the intended properties, composition, and reaction rate.

The second combining part 50 is located downstream of the first reaction part 30 of the first treatment part K1 and downstream of the third supply pump 17. The first polymerization solution C from the first reaction part 30 and the third solution A3 from the third supply pump 17 are combined in the second combining part 50 to produce the second combined solution D. The second combining part 50 includes a junction valve for combining the first polymerization solution C supplied from the first reaction part 30 with the third solution A3 supplied from the third supply pump 17.

The second reaction part 60 is a double tube extending in a specific direction and includes a second reaction mixing part 61 on the inside and a second reaction temperature control part 62 on the outside. The second combined solution D flows through the second reaction part 60 in a desired residence time.

In the second reaction mixing part 61, the second combined solution D of the first polymerization solution C and the third solution A3 is mixed without being in contact with gas. In the present embodiment, the second combined solution D adjusted by the second reaction temperature control part 62 to a temperature suitable for the polymerization reaction in the second reaction mixing part 61 is mixed without being in contact with gas.

For example, the second reaction mixing part 61 includes a static-type mixer, such as a static mixer, a nozzle, or an orifice, or a driven mixer, such as a centrifugal pump, a volute pump, or an in-line mixer with impeller blades, preferably a static-type mixer, more preferably a static mixer. Although a tube with an inner twisted tape has a mixing promoting effect similar to that of the static mixer, as described above, the static mixer has a higher mixing promoting effect and is therefore preferred.

The static mixer may be, but is not limited to, a Kenics mixer type, Sulzer SMV type, Sulzer SMX type, Tray Hi-mixer type, Komax mixer type, Lightnin mixer type, Ross ISG type, or Bran&Lube mixer type static mixer. Among these, a Kenics mixer type static mixer is more preferred due to its simple structure without a dead space.

The second reaction temperature control part 62 is a piping part outside the second reaction mixing part 61. The second reaction temperature control part 62 controls (for example, cools) the second combined solution D flowing through the second reaction mixing part 61 under desired temperature conditions. The second combined solution D is controlled at a temperature suitable for the polymerization reaction in the second reaction temperature control part 62 and flows through the second reaction mixing part 61.

The second cushion tank 70 receives a second polymerization solution E from the second reaction part 60. The second cushion tank 70 serves as a tank that holds a raw material solution, for example, in the production of a polyimide by imidization of a polyamic acid.

The polyamic acid manufacturing system 1A in the present embodiment may be part of a polyimide manufacturing system for manufacturing a polyimide. In such a case, the polyimide manufacturing system further includes an imidization part for imidizing a polyamic acid. In the imidization part (not shown), for example, a polyamic acid is imidized by a thermal imidization method for thermal cyclodehydration or by a chemical imidization method using a dehydrating agent and an imidization accelerator.

When the polyamic acid manufacturing system 1 in the present embodiment is part of a polyimide manufacturing system for manufacturing a polyimide, the second cushion tank 70 may be omitted, and the liquid may be transferred from the second reaction part 60 to the imidization part. The polyamic acid, however, is preferably temporarily held in the second cushion tank 70, as described above.

Next, a polyamic acid manufacturing method according to the second embodiment is described below with reference to FIG. 4. ST21 to ST24 in the present embodiment are the same as ST11 to ST14 in the first embodiment and are not described in detail. ST21 to ST24 in the present embodiment are as described in ST11 to ST14 in the first embodiment.

Figure 4:
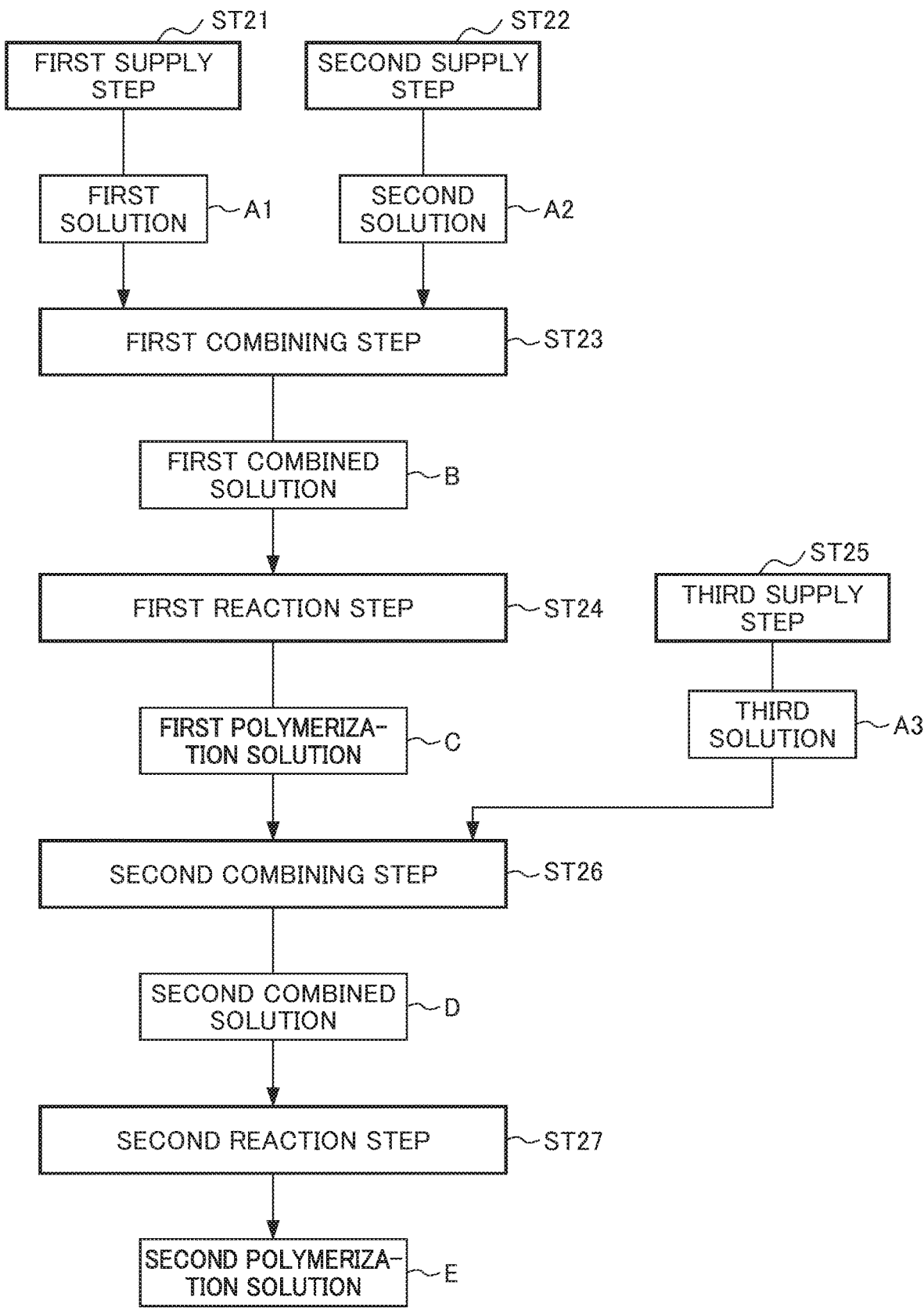
FIG. 4 is a flow chart of a polyamic acid manufacturing method according to the second embodiment.

As illustrated in FIG. 4, in the third supply step ST25, the third supply pump 17 supplies the third solution A3 contained in the third tank 13 to the second combining part 50. At the same time, the first polymerization solution C from the first reaction part 30 is supplied to the second combining part 50.

Subsequently, in the second combining step ST26, the first polymerization solution C from the first reaction part 30 and the third solution A3 supplied by the third supply pump 17 are combined in the second combining part 50 to produce the second combined solution D.

Subsequently, in the second reaction step ST27, the polyamic acid with the terminal acid anhydride group in the first polymerization solution C in the second combined solution D and the diamine in the third solution A3 are polymerized in the second reaction part 60 to produce the second polymerization solution E in which the polyamic acid is dissolved. More specifically, the second combined solution D not in contact with gas adjusted by the second reaction temperature control part 62 to a temperature suitable for the polymerization reaction in the second reaction mixing part 61 is polymerized while mixing to produce the second polymerization solution E. When the second reaction mixing part 61 is a static-type mixer, such as a static mixer, the second mixed solution D is mixed only by passing through the static-type mixer.

The polyamic acid manufacturing method in the present embodiment may be part of a polyimide manufacturing method. In such a case, the polyimide manufacturing method further includes an imidization step of imidizing a polyamic acid.

The polyamic acid manufacturing system 1A in the present embodiment has the following advantages in addition to the advantages of the first embodiment.

The polyamic acid manufacturing system 1A includes the first treatment part K1 and the second treatment part K2 and performs the polymerization reaction in two steps. Thus, the polyamic acid manufacturing system 1A can more easily achieve the target reaction rate and can further improve the quality and yield of the polyamic acid produced.

In addition to the first reaction part 30, the polyamic acid manufacturing system 1A includes the second reaction part 60 in which the second combined solution D of the first polymerization solution C and the third solution A3 not in contact with gas is mixed and produces the second polymerization solution E in which the polyamic acid is dissolved. Thus, the polyamic acid manufacturing system 1A can continuously and consistently manufacture a polyamic acid with fewer bubbles. More specifically, the polyamic acid manufacturing system 1A can continuously and consistently produce the second polymerization solution E in which the polyamic acid is dissolved, and can reduce bubbles in the second polymerization solution E.

Although the first polymerization solution C contains the polyamic acid with the terminal acid anhydride group, and the third solution A3 contains the diamine in the present embodiment, the present invention is not limited to this embodiment. For example, the first polymerization solution C may contain a polyamic acid with a terminal amino group, and the third solution A3 may contain a tetracarboxylic dianhydride.

Although the second reaction part 60 includes the double tube composed of the second reaction mixing part 61 and the second reaction temperature control part 62 in the present embodiment, the present invention is not limited to this embodiment. For example, the second reaction part 60 may be a single tube composed only of the second reaction mixing part 61, and the second reaction mixing part 61 may be immersed in a temperature control liquid.

Although the first tank 11 and the second tank 12 are hermetically connected to the second cushion tank 70 through the tubular liquid transfer line L in the present embodiment, the present invention is not limited to this embodiment. For example, to reduce bubbles in the second polymerization solution E, it is only necessary that the solution can be mixed without being in contact with gas in at least the first reaction part 30 and the second reaction part 60. As a matter of course, preferably, the solution is not in contact with gas throughout the liquid transfer line L, as described above.

Although the second combined solution D not in contact with gas is mixed in one reaction part (the second reaction part) in the present embodiment, the present invention is not limited to this embodiment. For example, the reaction part in which the second combined solution D not in contact with gas is mixed may include a pre-mixing part and a reaction mixing part immediately adjacent to the downstream side of the pre-mixing part. Like the second reaction part 60, the pre-mixing part and the reaction mixing part can include a static-type mixer. In such a case, the second combined solution D not in contact with gas is mixed in the pre-mixing part, and the solution mixed in the pre-mixing part is further mixed without being in contact with gas in the reaction mixing part, thus producing the second polymerization solution E. Such a polyamic acid manufacturing system can further improve the quality and yield of the polyamic acid produced.

Third Embodiment

A polyamic acid manufacturing system according to a third embodiment is described below with reference to FIGS. 5 to 8. The polyamic acid manufacturing system in the third embodiment includes one treatment part (reaction part), and the feed rate of the raw material solution can be controlled on the basis of measurement information from a measurement part.

First, a polyamic acid manufacturing system 1B according to the third embodiment is described below with reference to FIG. 5. The components described in the first embodiment are not described here.

The polyamic acid manufacturing system 1B includes a first measurement part for acquiring one or two or more pieces of first reaction information about the physical quantity and/or composition of at least one of the first solution A1, the second solution A2, the first combined solution B, and the first polymerization solution C (hereinafter referred to as a "first measurement object"). In the present embodiment, the polyamic acid manufacturing system 1B includes a plurality of first measurement parts. More specifically, the polyamic acid manufacturing system 1B includes a pump pressure measurement part 81, first differential pressure measurement parts 91 and 92, and a first viscosity measurement part 111.

The pump pressure measurement part 81 acquires the pump pressure information of the first supply pump 15 as the first reaction information. The pump pressure measurement part 81 acquires, for example, pump pressure numerical information or voltage or current value information as the first reaction information.

The first differential pressure measurement parts 91 and 92 acquire input/output differential pressure (upstream/downstream differential pressure) information of the first reaction part 30 as the first reaction information.

The first viscosity measurement part 111 acquires the viscosity information of the first polymerization solution C as the first reaction information. The viscosity increases as the polymerization reaction proceeds. Thus, the viscosity information is effective as the first reaction information.

The first measurement part is not limited to the measurement part (the type and measurement method of physical quantity and/or composition) in the present embodiment. For example, the first measurement part includes one or two or more selected from the group consisting of viscometers, pressure gauges, pump pressure gauges, absorption spectrometers, infrared spectrometers, near-infrared spectrometers, densitometers, color difference meters, refractometers, spectrophotometers, electrical conductivity meters, turbidimeters, and X-ray fluorescence spectrometers.

The first measurement part acquires one or two or more pieces of first reaction information about the physical quantity and/or composition in the first measurement object and outputs the acquired first reaction information to a first control part 200B described later.

Next, the block diagram of the polyamic acid manufacturing system 1B according to the third embodiment is described below with reference to FIG. 6. As illustrated in FIG. 6, the polyamic acid manufacturing system 1B includes a plurality of first measurement parts (a first measurement part group), the first control part 200B, a first storage part 300B, and the first supply pump 15 and the second supply pump 16 to be controlled.

As described above, the first measurement part acquires one or two or more pieces of first reaction information about the physical quantity and/or composition in the first measurement object. The polyamic acid manufacturing system 1B includes a plurality of first measurement parts. More specifically, the polyamic acid manufacturing system 1B includes the pump pressure measurement part 81, the first differential pressure measurement parts 91 and 92, and the first viscosity measurement part 111. The first reaction information includes electric signals that change with the physical quantity and/or composition, as well as numerical information, such as the physical quantity and/or composition measured.

The first control part 200B controls supply in the first supply pump 15 and/or the second supply pump 16 on the basis of the first reaction information acquired by the first measurement part. The first control part 200B includes a judgment part 210B, a selection part 220B, and an instruction part 230B.

The judgment part 210B judges whether the measured values of the physical quantity and/or composition in the first measurement object are within a predetermined acceptable range on the basis of the first reaction information from the first measurement part. The judgment part 210B acquires the first reaction information from the first measurement part at measurement intervals stored in a measurement interval information storage part 310B described later and judges whether the acquired first reaction information is within a predetermined acceptable range on the basis of acceptable range information stored in an acceptable range information storage part 320B described later.

The selection part 220B selects the first reaction information with high control priority on the basis of priority information from a priority information storage part 340B described later when multiple pieces of first reaction information are judged to be outside the acceptable range by the judgment part 210B. The selection part 220B selects another piece of complementary first reaction information to determine control items on the basis of complementary information from a complementary information storage part 330B described later when the first reaction information judged to be outside the acceptable range by the judgment part 210B is particular information, for example, when the first reaction information is viscosity information. For example, when the first reaction information is viscosity information, it may not be known which of the first solution A1 and the second solution A2 should be increased, even if the measured viscosity value indicates an insufficient polymerization reaction. The selection part 220B selects another piece of first reaction information to complement viscosity information on the basis of the complementary information.

The instruction part 230B controls supply in the first supply pump 15 and/or the second supply pump 16 on the basis of control information from a control information storage part 350B described later. On the basis of information from the judgment part 210B and the selection part 220B, the instruction part 230B acquires control information that includes control items stored in the control information storage part 350B. The instruction part 230B controls the first supply pump 15 and/or the second supply pump 16 on the basis of the acquired control information.

The first storage part 300B includes the measurement interval information storage part 310B, the acceptable range information storage part 320B, the complementary information storage part 330B, the priority information storage part 340B, and the control information storage part 350B.

The measurement interval information storage part 310B stores measurement interval information about the intervals at which the first control part 200B (the judgment part 210B) acquires the first reaction information from the first measurement part. The measurement intervals are determined for each first measurement part (first reaction information). The measurement intervals depend on the position of the first measurement part (the upstream or downstream position on the liquid transfer line L).

For the first reaction information acquired by each first measurement part, the acceptable range information storage part 320B stores information about the acceptable range (for example, the measurement range, signal intensities, etc.) with respect to the quality required for the production of the desired polymer.

The complementary information storage part 330B stores information by which first reaction information to be selected as complementary information when various pieces of first reaction information (various first measurement parts) are particular pieces of first reaction information (particular measurement parts) can be identified. The complementary information storage part 330B stores the particular pieces of first reaction information in connection with the complementary first reaction information. For example, the complementary information storage part 330B stores information that specified first reaction information complements viscosity information.

The priority information storage part 340B stores information about first reaction information that has priority when the judgment part 210B judges that multiple pieces of first reaction information (first measurement parts) are outside the acceptable range (for example, priority order information).

The control information storage part 350B stores information about control items corresponding to the contents of first reaction information judged to be outside the acceptable range. For example, the control information storage part 350B stores control information about an increase/decrease in feed rate in the first supply pump 15 and/or the second supply pump 16.

Figure 7:
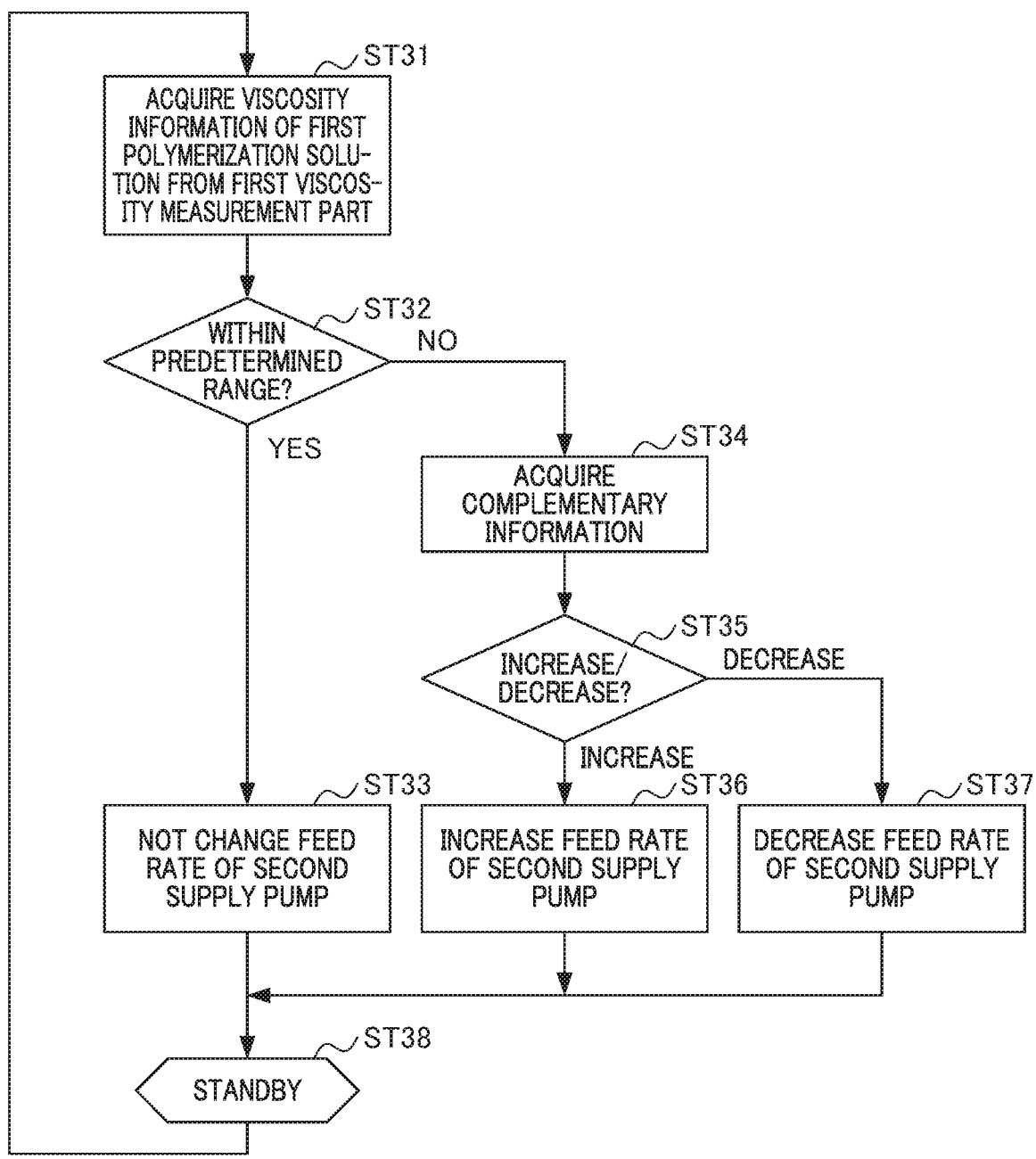
FIG. 7 is a flow chart of an operation of the polyamic acid manufacturing system according to the third embodiment.

Next, the operation of the polyamic acid manufacturing system 1B according to the third embodiment is described below with reference to FIG. 7. This embodiment describes control that utilizes viscosity information as the first reaction information. As illustrated in FIG. 7, in the step ST31, the judgment part 210B acquires viscosity information as the first reaction information from the first viscosity measurement part 111, which is the first measurement part.

Subsequently, in the step ST32, the judgment part 210B judges whether the acquired viscosity information is within a predetermined acceptable range on the basis of the acceptable range information stored in the acceptable range information storage part 320B. In the case where the judgment part 210B judges that the viscosity information (viscosity value) is within the predetermined range (YES), the feed rate of the second supply pump 16 is not changed (step ST33). In the case where the judgment part 210B judges that the viscosity information (viscosity value) is outside the predetermined range (NO), the process proceeds to the step ST34.

Subsequently, in the step ST34, the selection part 220B acquires complementary information about first reaction information (type) that complements the viscosity information from the complementary information storage part 330B.

Subsequently, in the step ST35, the instruction part 230B acquires control information, such as control conditions, from the control information storage part 350B on the basis of the contents of the viscosity information and the contents of the first reaction information identified from the complementary information. The instruction part 230B controls the second supply pump 16 on the basis of the acquired control information. When a control item indicates an increase in the feed rate of the second supply pump 16 (increase), the instruction part 230B controls the second supply pump 16 to increase the feed rate (step ST36). When a control item indicates a decrease in the feed rate of the second supply pump 16 (decrease), the instruction part 230B controls the second supply pump 16 to decrease the feed rate (step ST37).

The first control part 200B then goes into standby (step ST38). The first control part 200B acquires viscosity information from the first viscosity measurement part 111 at predetermined intervals on the basis of the measurement interval information stored in the measurement interval information storage part 310B.

Figure 8:
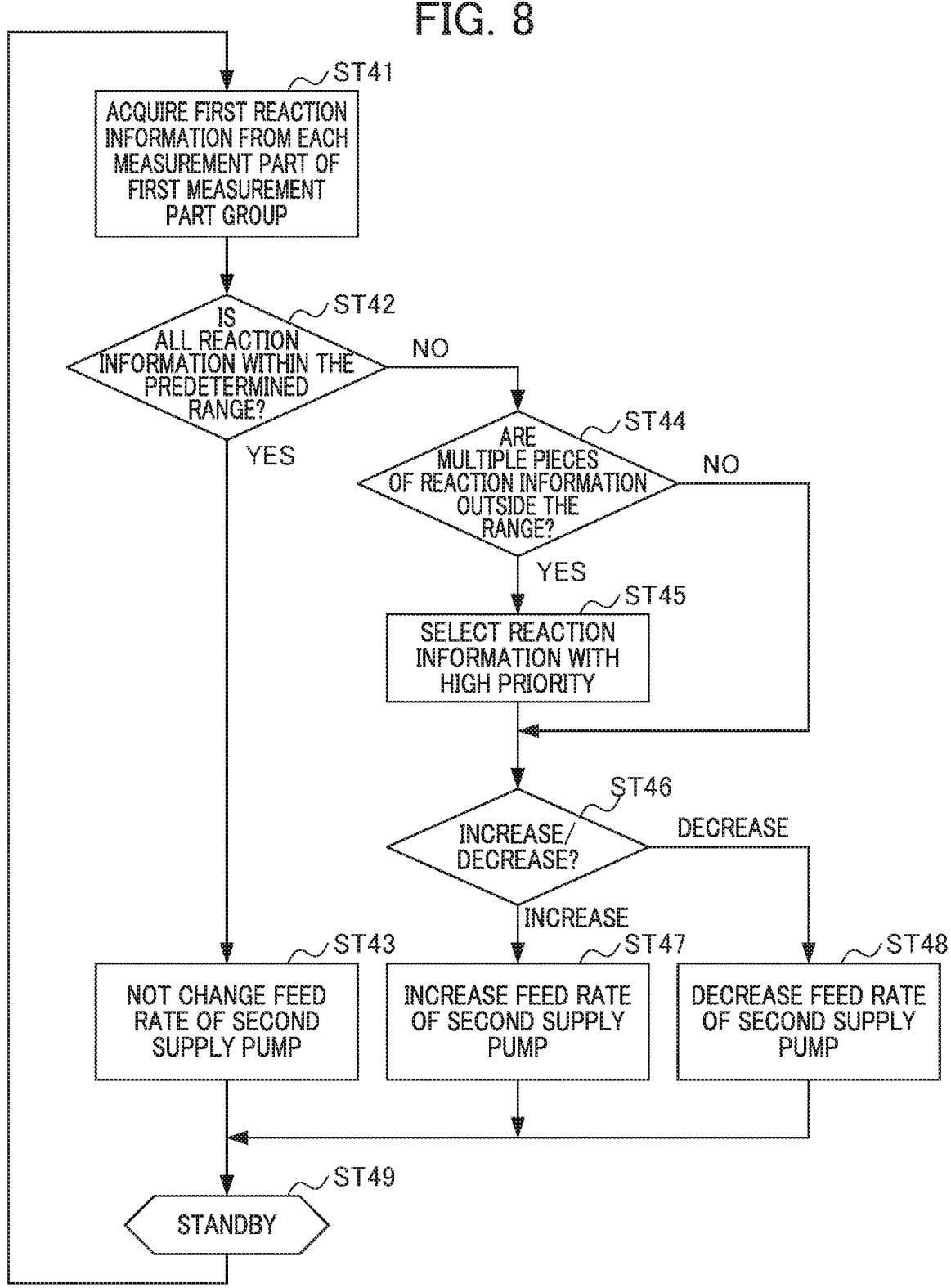
FIG. 8 is a flow chart of another operation of the polyamic acid manufacturing system according to the third embodiment.

Next, another operation of the polyamic acid manufacturing system 1B according to the third embodiment is described below with reference to FIG. 8. This embodiment describes control that utilizes multiple pieces of first reaction information. As illustrated in FIG. 8, in the step ST41, the judgment part 210B acquires first reaction information from each measurement part of the first measurement part group.

Subsequently, in the step ST42, the judgment part 210B judges whether all the acquired first reaction information is within a predetermined acceptable range on the basis of the acceptable range information stored in the acceptable range information storage part 320B. In the case where the judgment part 210B judges that all the first reaction information is within the predetermined range (YES), the feed rate of the second supply pump 16 is not changed (step ST43). In the case where the judgment part 210B judges that not all the first reaction information is within the predetermined range (one or more pieces of first reaction information are outside the predetermined range) (NO), the process proceeds to the step ST44.

Subsequently, in the step ST44, in the case where multiple pieces of first reaction information are outside the predetermined range (YES), the judgment part 210B moves the process to the step ST45. In the case where first reaction information outside the predetermined range is not plural (NO), the judgment part 210B moves the process to the step 46.

Subsequently, in the step ST45, the selection part 220B selects first reaction information with high priority (type) on the basis of priority information stored in the priority information storage part 340B.

Subsequently, in the step ST46, the instruction part 230B acquires control information, such as control conditions, from the control information storage part 350B on the basis of the contents of the first reaction information outside the predetermined range. The instruction part 230B controls the second supply pump 16 on the basis of the acquired control information. When a control item indicates an increase in the feed rate of the second supply pump 16 (increase), the instruction part 230B controls the second supply pump 16 to increase the feed rate (step ST47). When a control item indicates a decrease in the feed rate of the second supply pump 16 (decrease), the instruction part 230B controls the second supply pump 16 to decrease the feed rate (step ST48).

The first control part 200B then goes into standby (step ST49). The first control part 200B acquires first reaction information from each measurement part of the first measurement part group at predetermined intervals on the basis of the measurement interval information stored in the measurement interval information storage part 310B.

The polyamic acid manufacturing system 1B in the present embodiment has the following advantages in addition to the advantages of the first embodiment.

The polyamic acid manufacturing system 1B includes the first measurement part for acquiring first reaction information about the physical quantity and/or composition in the first measurement object, and the first control part for controlling supply in the first supply pump 15 and/or the second supply pump 16 on the basis of the first reaction information acquired by the first measurement part. Thus, the polyamic acid manufacturing system 1B can continuously and consistently manufacture a desired polyamic acid. Furthermore, the polyamic acid manufacturing system 1B can reduce the out-of-specification rate in continuous manufacture of a polyamic acid.

In the polyamic acid manufacturing system 1B, the first measurement part includes one or two or more selected from the group consisting of viscometers, pressure gauges, pump pressure gauges, absorption spectrometers, infrared spectrometers, near-infrared spectrometers, densitometers, color difference meters, refractometers, spectrophotometers, electrical conductivity meters, turbidimeters, and X-ray fluorescence spectrometers. Thus, the polyamic acid manufacturing system 1B can control supply in the first supply pump 15 and/or the second supply pump 16 on the basis of multiple types of first reaction information acquired by multiple types of first measurement parts and can therefore more appropriately control the polymerization reaction.

Fourth Embodiment

Next, a polyamic acid manufacturing system according to a fourth embodiment is described below with reference to FIGS. 9 to 12. The polyamic acid manufacturing system in the fourth embodiment includes two treatment parts (reaction parts), and the feed rate of the raw material solution can be controlled on the basis of measurement information from a measurement part.

Figure 9:
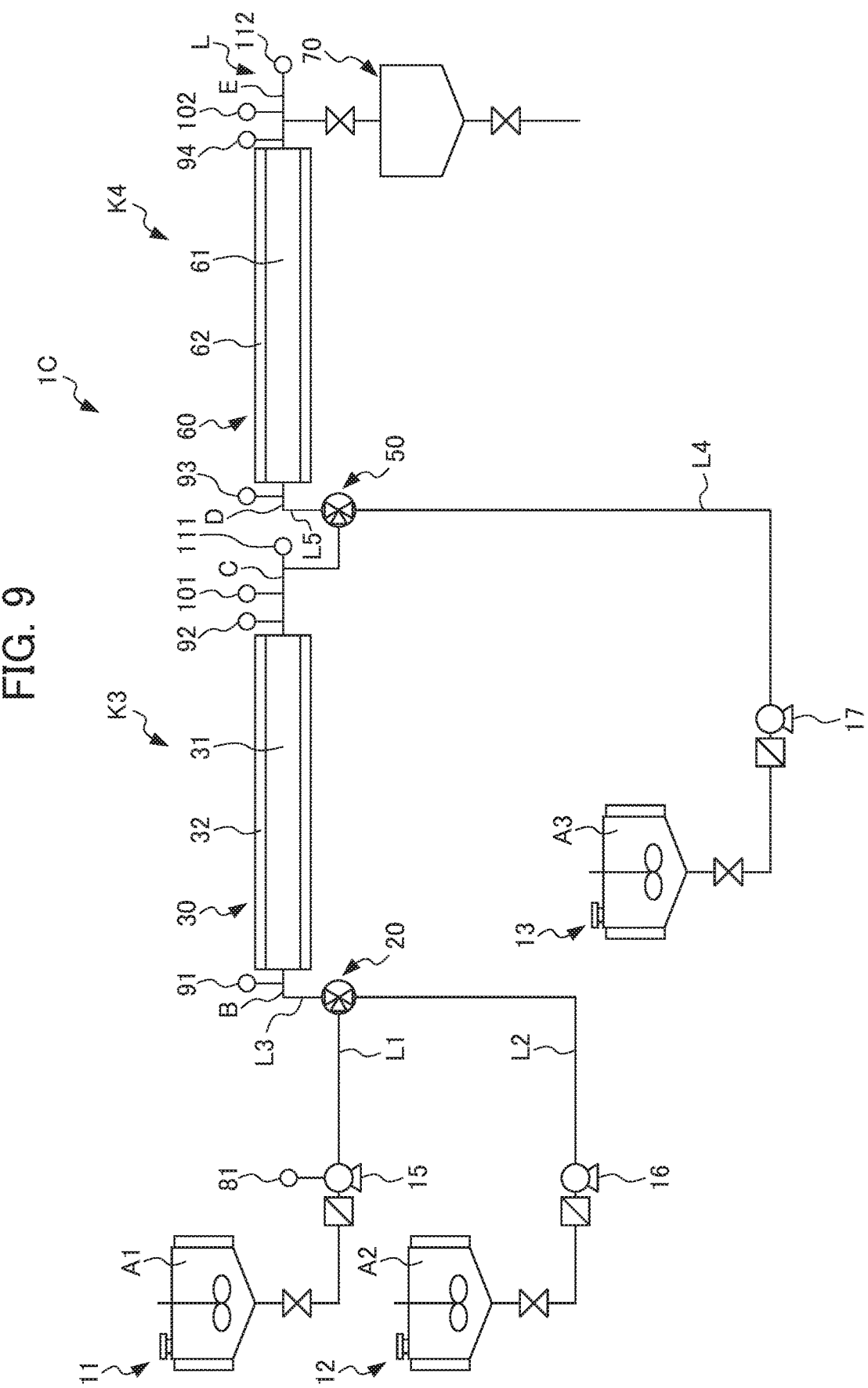
FIG. 9 is a schematic view of a polyamic acid manufacturing system according to a fourth embodiment.

First, a polyamic acid manufacturing system 1C according to the fourth embodiment is described below with reference to FIG. 9. As illustrated in FIG. 9, the polyamic acid manufacturing system 1C includes a first treatment part K3 and a second treatment part K4.

The first treatment part K3 is the same as in the polyamic acid manufacturing system 1B according to the third embodiment and is not described in detail in the present embodiment. Components of the second treatment part K4 described in the second embodiment are not described in detail in the present embodiment.

In addition to the first measurement parts, the polyamic acid manufacturing system 1C includes a second measurement part for acquiring one or two or more pieces of second reaction information about the physical quantity and/or composition of at least one of the first polymerization solution C, the third solution A3, the second combined solution D, and the second polymerization solution E (hereinafter referred to as a "second measurement object"). In the present embodiment, the polyamic acid manufacturing system 1C includes a plurality of second measurement parts. More specifically, the polyamic acid manufacturing system 1C includes second differential pressure measurement parts 93 and 94, a second viscosity measurement part 112, a first absorbance measurement part 101, and a second absorbance measurement part 102.

The second differential pressure measurement parts 93 and 94 acquire input/output differential pressure (upstream/downstream differential pressure) information of the second reaction part 60 as the second reaction information.

The second viscosity measurement part 112 acquires the viscosity information of the second polymerization solution E as the second reaction information. The viscosity increases as the polymerization reaction proceeds. Thus, the viscosity information is effective as the second reaction information.

The first absorbance measurement part 101 acquires information about absorbance at a particular wavelength in the first polymerization solution C as the second reaction information. The second absorbance measurement part 102 acquires information about absorbance at a particular wavelength in the second polymerization solution E as the second reaction information. An absorbance difference can be calculated from the absorbance information acquired by the first absorbance measurement part 101 and the absorbance information acquired by the second absorbance measurement part 102.

The second measurement part is not limited to the measurement part (the type and measurement method of physical quantity and/or composition) in the present embodiment. For example, the second measurement part includes one or two or more selected from the group consisting of viscometers, pressure gauges, pump pressure gauges, absorption spectrometers, infrared spectrometers, near-infrared spectrometers, densitometers, color difference meters, refractometers, spectrophotometers, electrical conductivity meters, turbidimeters, and X-ray fluorescence spectrometers.

The second measurement part acquires one or two or more pieces of second reaction information about the physical quantity and/or composition in the second measurement object and outputs the acquired second reaction information to a second control part 200C described later.

Figure 10:
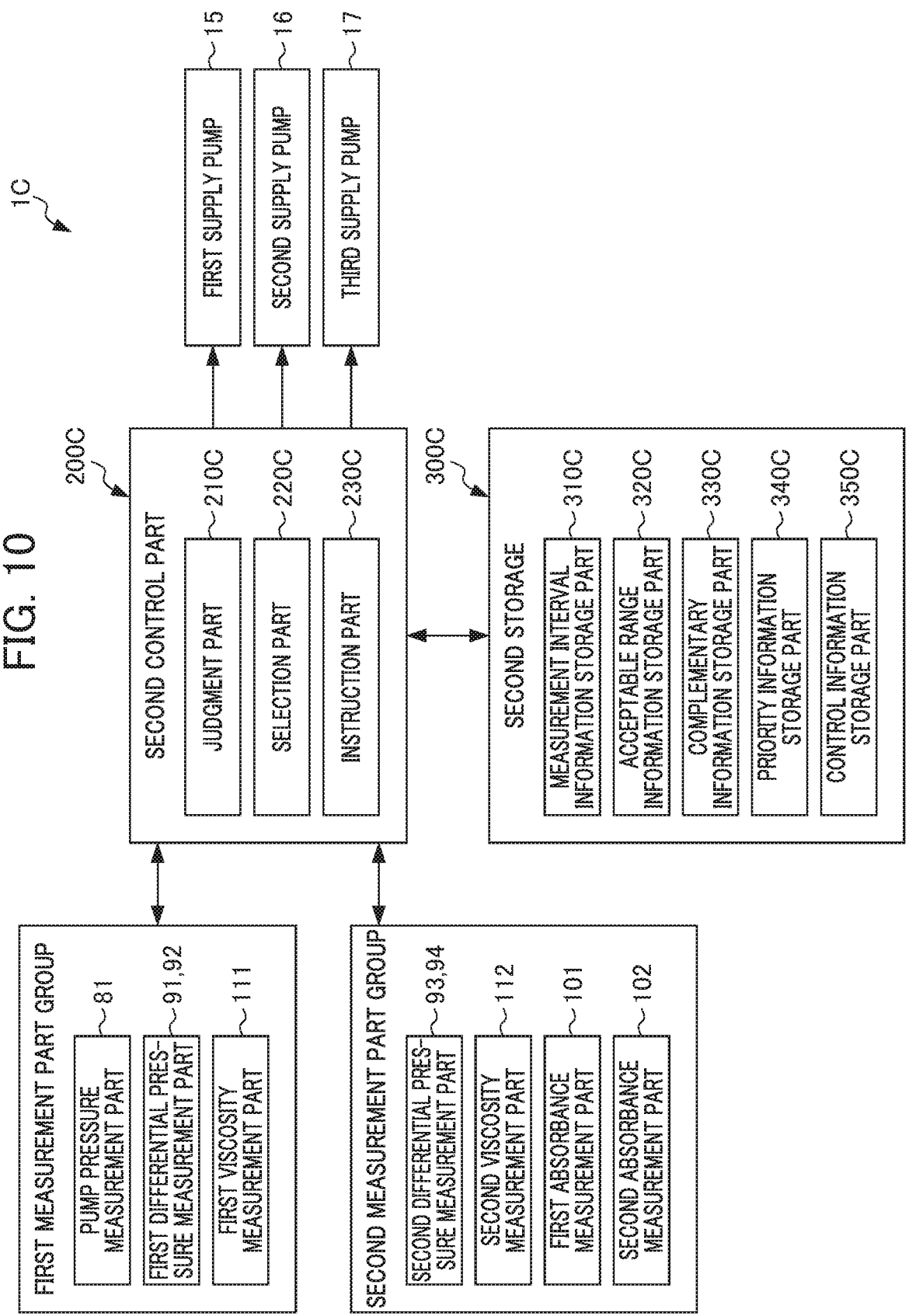
FIG. 10 is a block diagram of the polyamic acid manufacturing system according to the fourth embodiment.

Next, the block diagram of the polyamic acid manufacturing system 1C according to the fourth embodiment is described below with reference to FIG. 10. As illustrated in FIG. 6, the polyamic acid manufacturing system 1C includes a plurality of first measurement parts (a first measurement part group), a plurality of second measurement parts (a second measurement part group), the second control part 200C, a second storage 300C, the first supply pump 15 to be controlled, the second supply pump 16 to be controlled, and the third supply pump 17 to be controlled.

As described above, the second measurement part acquires one or two or more pieces of second reaction information about the physical quantity and/or composition in the second measurement object. The polyamic acid manufacturing system 1C includes a plurality of second measurement parts. More specifically, the polyamic acid manufacturing system 1C includes second differential pressure measurement parts 93 and 94, a second viscosity measurement part 112, a first absorbance measurement part 101, and a second absorbance measurement part 102. The second reaction information includes electric signals that change with the physical quantity and/or composition, as well as numerical information, such as the physical quantity and/or composition measured.

The second control part 200C controls supply in the third supply pump 17 on the basis of the first reaction information acquired by the first measurement part and/or the second reaction information acquired by the second measurement part. The second control part 200C also has the functions of the first control part and is configured to control supply in the first supply pump 15 and/or the second supply pump 16 on the basis of the first reaction information acquired by the first measurement part. The same components as in the third embodiment have the functions described in the third embodiment as well as the functions described below in the present embodiment.

The second control part 200C includes a judgment part 210C, a selection part 220C, and an instruction part 230C.

The judgment part 210C judges whether the measured values of the physical quantity and/or composition in the first measurement object and/or the second measurement object are within a predetermined acceptable range on the basis of the first reaction information and/or the second reaction information. The judgment part 210C acquires the first reaction information and/or the second reaction information from the first measurement part and/or the second measurement part at measurement intervals stored in a measurement interval information storage part 310C described later and judges whether the acquired first reaction information and/or second reaction information is within a predetermined acceptable range on the basis of acceptable range information stored in an acceptable range information storage part 320C described later.

The selection part 220C selects the first reaction information and/or the second reaction information with high control priority on the basis of priority information from a priority information storage part 340C described later when multiple pieces of first reaction information and/or second reaction information are judged to be outside the acceptable range by the judgment part 210C.

The selection part 220C selects another piece of complementary first reaction information and/or second reaction information to determine the control items on the basis of complementary information from a complementary information storage part 330C described later when the first reaction information and/or the second reaction information judged to be outside the acceptable range by the judgment part 210C is particular information, for example, when the first reaction information and/or the second reaction information is viscosity information. For example, when the first reaction information and/or the second reaction information is viscosity information, it may not be known which of the first polymerization solution C and the third solution A3 should be increased, even if the measured viscosity value indicates an insufficient polymerization reaction. The selection part 220C selects another piece of first reaction information and/or second reaction information to complement viscosity information on the basis of the complementary information.

The instruction part 230C controls supply in the third supply pump 17 on the basis of control information from a control information storage part 350C described later. On the basis of information from the judgment part 210C and the selection part 220C, the instruction part 230C acquires control information that includes control items stored in the control information storage part 350C. The instruction part 230C controls the third supply pump 17 on the basis of the acquired control information.

The second storage 300C includes the measurement interval information storage part 310C, the acceptable range information storage part 320C, the complementary information storage part 330C, the priority information storage part 340C, and the control information storage part 350C. The same components as in the third embodiment have the functions described in the third embodiment as well as the functions described below in the present embodiment.

The measurement interval information storage part 310C stores measurement interval information about the intervals at which the second control part 200C (the judgment part 210C) acquires the first reaction information from the first measurement part and the second reaction information from the second measurement part. The measurement intervals are determined for each first measurement part (first reaction information). The measurement intervals depend on the position of the first measurement part (the upstream or downstream position on the liquid transfer line L). Likewise, the measurement intervals are determined for each second measurement part (second reaction information). The measurement intervals depend on the position of the second measurement part (the upstream or downstream position on the liquid transfer line L).

For the first reaction information acquired by each first measurement part, the acceptable range information storage part 320C stores information about the acceptable range (for example, the measurement range, signal intensities, etc.) with respect to the quality required for the production of the desired polymer. For the second reaction information acquired by each second measurement part, the acceptable range information storage part 320C stores information about the acceptable range (for example, the measurement range, signal intensities, etc.) with respect to the quality required for the production of the desired polymer.

The complementary information storage part 330C stores information by which first reaction information and/or second reaction information to be selected as complementary information when various pieces of first reaction information (various first measurement parts) and/or various pieces of second reaction information (various second measurement parts) are particular pieces of first reaction information (particular measurement parts) and/or particular second reaction information (particular measurement parts) can be identified. The complementary information storage part 330C stores the particular pieces of first reaction information and/or second reaction information in connection with the complementary first reaction information and/or second reaction information. For example, the complementary information storage part 330C stores information that specified first reaction information and/or second reaction information complements viscosity information.

The priority information storage part 340C stores information about first reaction information and/or second reaction information that has priority when the judgment part 210C judges that multiple pieces of first reaction information (first measurement parts) and/or second reaction information (second measurement parts) are outside the acceptable range (for example, priority order information). For example, the priority information storage part 340C stores information that viscosity information has priority.

The control information storage part 350C stores information about the control items corresponding to the contents of first reaction information and/or second reaction information judged to be outside the acceptable range. For example, the control information storage part 350C stores control information about an increase/decrease in feed rate in the third supply pump 17.

Figure 11:
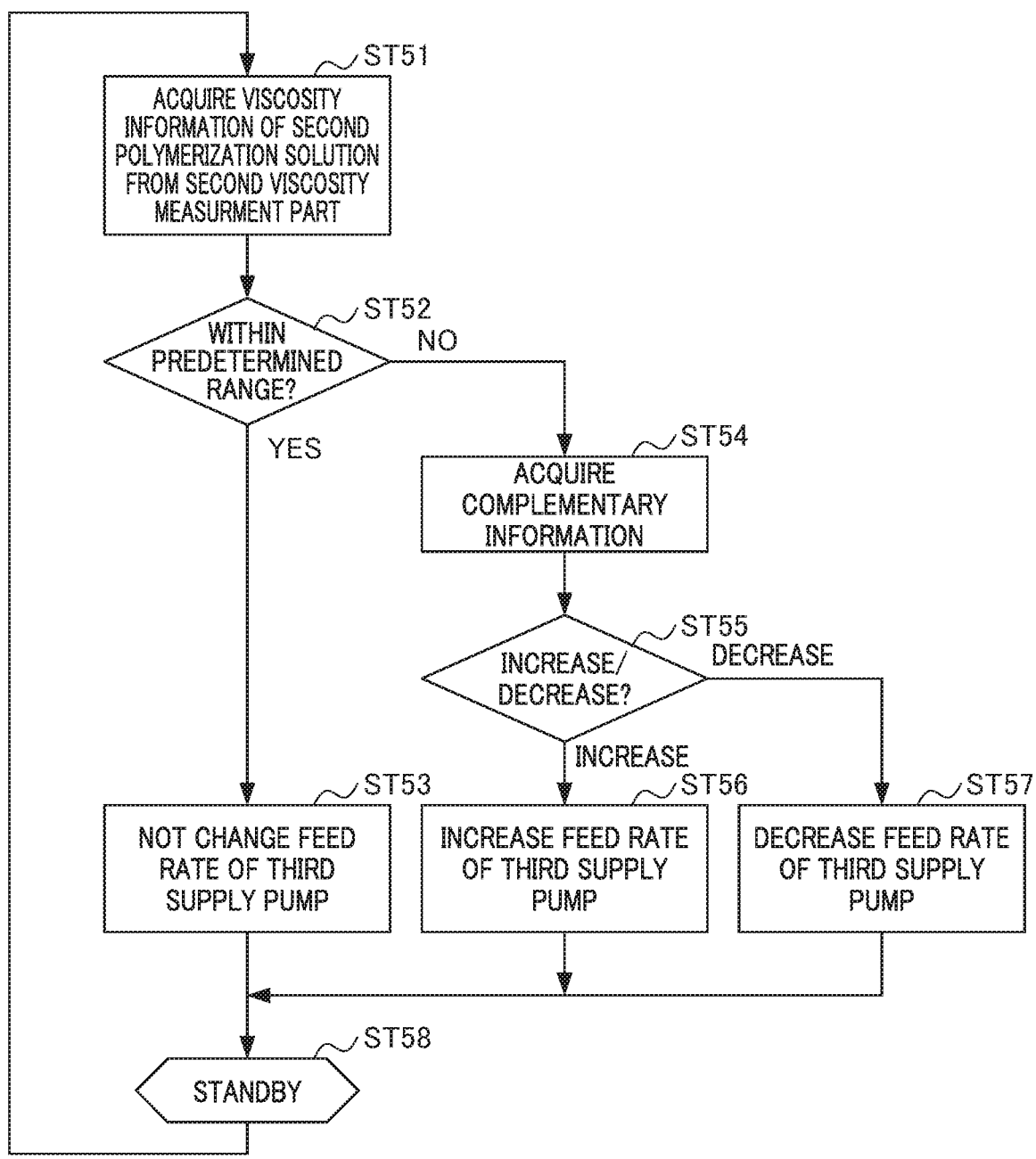
FIG. 11 is a flow chart of an operation of the polyamic acid manufacturing system according to the fourth embodiment.

Next, the operation of the polyamic acid manufacturing system 1C according to the fourth embodiment is described below with reference to FIG. 11. This embodiment describes control that utilizes viscosity information as the second reaction information. As illustrated in FIG. 11, in the step ST51, the judgment part 210C acquires viscosity information as the second reaction information from the second viscosity measurement part 112, which is the second measurement part.

In the step ST52, the judgment part 210C then judges whether the acquired viscosity information is within a predetermined acceptable range on the basis of the acceptable range information stored in the acceptable range information storage part 320C. In the case where the judgment part 210C judges that the viscosity information (viscosity value) is within the predetermined range (YES), the feed rate of the third supply pump 17 is not changed (step ST53). In the case where the judgment part 210C judges that the viscosity information (viscosity value) is outside the predetermined range (NO), the process proceeds to the step ST54.

In the step ST54, the selection part 220C then acquires complementary information about first reaction information (type) and/or second reaction information (type) that complements the viscosity information from the complementary information storage part 330C.

In the step ST55, the instruction part 230C then acquires control information, such as control conditions, from the control information storage part 350C on the basis of the contents of the viscosity information and the contents of the first reaction information and/or second reaction information identified from the complementary information. The instruction part 230C controls the third supply pump 17 on the basis of the acquired control information. When a control item indicates an increase in the feed rate of the third supply pump 17 (increase), the instruction part 230C controls the third supply pump 17 to increase the feed rate (step ST56). When a control item indicates a decrease in the feed rate of the third supply pump 17 (decrease), the instruction part 230C controls the third supply pump 17 to decrease the feed rate (step ST57).

The second control part 200C then goes into standby (step ST58). The second control part 200C acquires viscosity information from the second viscosity measurement part 112 at predetermined intervals on the basis of the measurement interval information stored in the measurement interval information storage part 310C.

Figure 12:
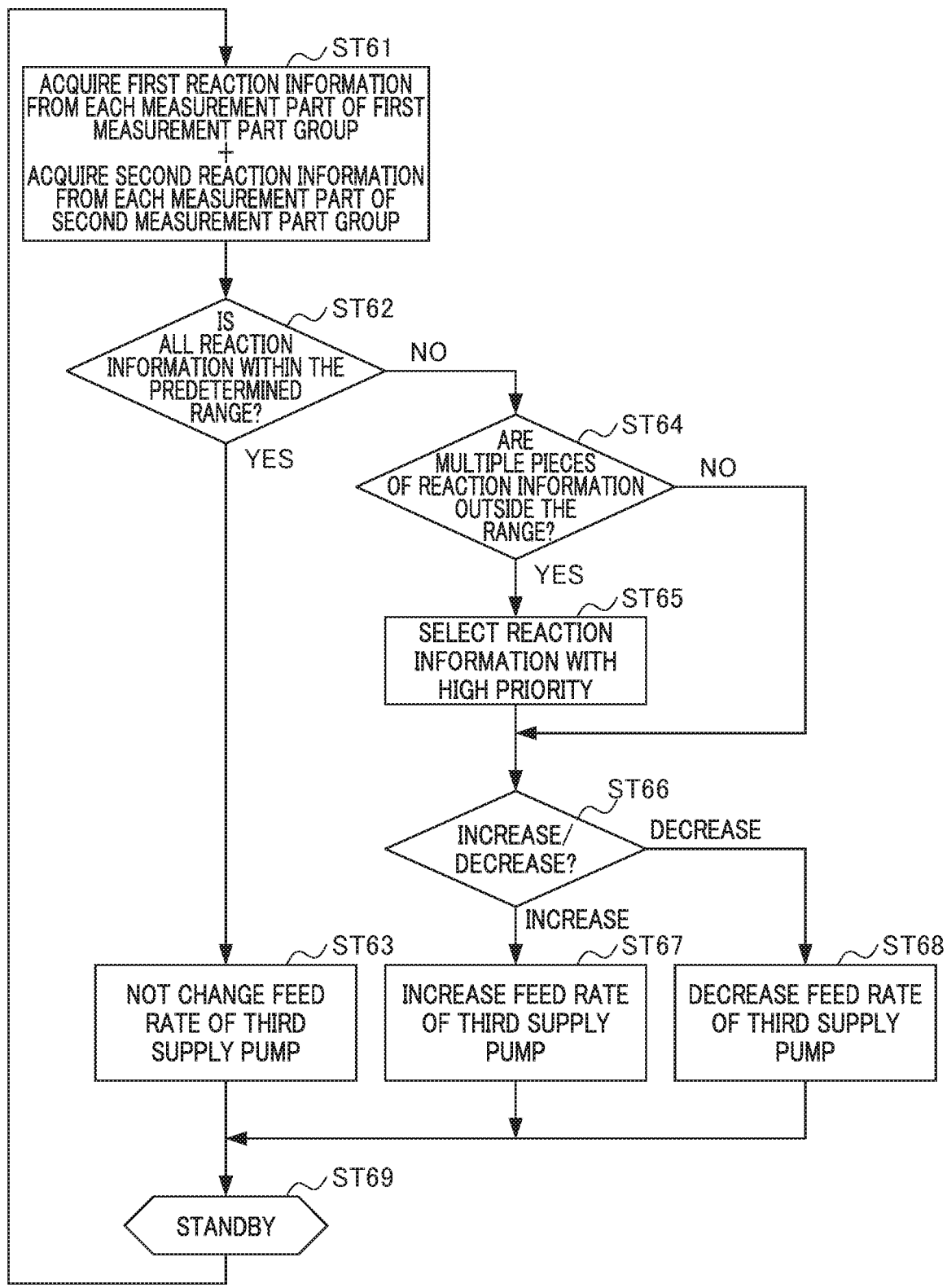
FIG. 12 is a flow chart of another operation of the polyamic acid manufacturing system according to the fourth embodiment.

Next, another operation of the polyamic acid manufacturing system 1C according to the fourth embodiment is described below with reference to FIG. 12. This embodiment describes control that utilizes multiple pieces of first reaction information and second reaction information. As illustrated in FIG. 12, in the step ST61, the judgment part 210C acquires first reaction information from each measurement part of the first measurement part group and acquires second reaction information from each measurement part of the second measurement part group.

Subsequently, in the step ST62, the judgment part 210C judges whether all the acquired first reaction information and second reaction information are within a predetermined acceptable range on the basis of the acceptable range information stored in the acceptable range information storage part 320C. In the case where the judgment part 210C judges that all the first reaction information and second reaction information are within the predetermined range (YES), the feed rate of the third supply pump 17 is not changed (step ST63). In the case where the judgment part 210C judges that not all the first reaction information and second reaction information is within the predetermined range (one or more pieces of reaction information are outside the predetermined range) (NO), the process proceeds to the step ST64.

In the step ST64, in the case where multiple pieces of reaction information are outside the predetermined range (YES), the judgment part 210C moves the process to the step ST65. In the case where reaction information outside the predetermined range is not plural (NO), the judgment part 210C moves the process to the step 66.

Subsequently, in the step ST65, the selection part 220C selects first reaction information with high priority (type) and/or second reaction information with high priority (type) on the basis of priority information.

Subsequently, in the step ST66, the instruction part 230C acquires control information, such as control conditions, from the control information storage part 350C on the basis of the contents of the reaction information outside the predetermined range. The instruction part 230C controls the third supply pump 17 on the basis of the acquired control information. When a control item indicates an increase in the feed rate of the third supply pump 17 (increase), the instruction part 230C controls the third supply pump 17 to increase the feed rate (step ST67). When a control item indicates a decrease in the feed rate of the third supply pump 17 (decrease), the instruction part 230C controls the third supply pump 17 to decrease the feed rate (step ST68).

The second control part 200C then goes into standby (step ST69). The second control part 200C acquires first reaction information from each first measurement part and second reaction information from each second measurement part at predetermined intervals on the basis of the measurement interval information stored in the measurement interval information storage part 310C.

The polyamic acid manufacturing system 1C in the present embodiment has the following advantages in addition to the advantages of the second embodiment.

The polyamic acid manufacturing system 1C includes the first measurement part for acquiring first reaction information about the physical quantity and/or composition in the first measurement object, the second measurement part for acquiring second reaction information about the physical quantity and/or composition in the second measurement object, and the first control part for controlling supply in at least one of the first supply pump 15, the second supply pump 16, and the third supply pump 17 on the basis of the first reaction information acquired by the first measurement part and/or the second reaction information acquired by the second measurement part. Thus, the polyamic acid manufacturing system 1C can continuously and consistently manufacture a desired polyamic acid. Furthermore, the polyamic acid manufacturing system 1C can reduce the out-of-specification rate in continuous manufacture of a polyamic acid.

In the polyamic acid manufacturing system 1C, the first measurement part and the second measurement part include one or two or more selected from the group consisting of viscometers, pressure gauges, pump pressure gauges, absorption spectrometers, infrared spectrometers, near-infrared spectrometers, densitometers, color difference meters, refractometers, spectrophotometers, electrical conductivity meters, turbidimeters, and X-ray fluorescence spectrometers. Thus, the polyamic acid manufacturing system 1C can control supply in at least one of the first supply pump 15, the second supply pump 16, and the third supply pump 17 on the basis of multiple types of first reaction information acquired by multiple types of first measurement parts and/or multiple types of second reaction information acquired by multiple types of second measurement part and can therefore more appropriately control the polymerization reaction.

(Specific Examples of Control)

Specific examples of control in the polyamic acid manufacturing system 1B and the polyamic acid manufacturing system 1C are described below. The present invention is not limited to the following specific examples.

(1) Example 1

It is assumed that the first polymerization solution C at the outlet of the first reaction part 30 has a viscosity lower than the set value. An in-line viscometer is installed at the outlet of the first reaction part 30, and the viscosity information of the first polymerization solution C is successively acquired. To increase the viscosity, the flow ratio may be controlled such that the tetracarboxylic dianhydride/diamine ratio approaches the equivalent ratio.

(2) Example 2

It is assumed that the first polymerization solution C at the outlet of the first reaction part 30 has a viscosity lower than the set value. Two pressure gauges are installed near the outlet of the first reaction part 30, and the viscosity information of the first polymerization solution C is successively acquired from the differential pressure. To increase the viscosity, the flow ratio may be controlled such that the tetracarboxylic dianhydride/diamine ratio approaches the equivalent ratio.

(3) Example 3

It is assumed that the first polymerization solution C at the outlet of the first reaction part 30 has a viscosity lower than the set value. An in-line viscometer is installed at the outlet of the first reaction part 30, and the viscosity information of the first polymerization solution C is successively acquired. In addition, an in-line absorption spectrometer is installed at the outlet of the first reaction part 30, and the absorbance information of the first polymerization solution C is successively acquired. A judgment is made about which of the tetracarboxylic dianhydride and the diamine is excessive on the basis of the absorbance information that is detected when there is an excess monomer. To increase the viscosity, the flow ratio may be controlled such that the tetracarboxylic dianhydride/diamine ratio approaches the equivalent ratio.

(4) Example 4

It is assumed that the first polymerization solution C at the outlet of the first reaction part 30 has a viscosity lower than the set value. An in-line viscometer is installed at the outlet of the first reaction part 30, and the viscosity information of the first polymerization solution C is successively acquired. In addition, an in-line infrared spectrometer is installed at the outlet of the first reaction part 30, and the infrared spectroscopy information of the first polymerization solution C is successively acquired. A judgment is made about which of the tetracarboxylic dianhydride and the diamine is excessive on the basis of the infrared spectroscopy information that is detected when there is an excess monomer. To increase the viscosity, the flow ratio may be controlled such that the tetracarboxylic dianhydride/diamine ratio approaches the equivalent ratio.

(5) Example 5

It is assumed that the first polymerization solution C at the outlet of the first reaction part 30 has a viscosity lower than the set value. Two pressure gauges are installed near the outlet of the first reaction part 30, and the viscosity information of the first polymerization solution C is successively acquired from the differential pressure. In addition, an in-line absorption spectrometer is installed at the outlet of the first reaction part 30, and the absorbance information of the first polymerization solution C is successively acquired. A judgment is made about which of the tetracarboxylic dianhydride and the diamine is excessive on the basis of the absorbance information that is detected when there is an excess monomer. To increase the viscosity, the flow ratio may be controlled such that the tetracarboxylic dianhydride/diamine ratio approaches the equivalent ratio.

(6) Example 6

It is assumed that the first polymerization solution C at the outlet of the first reaction part 30 has a viscosity lower than the set value. Two pressure gauges are installed near the outlet of the first reaction part 30, and the viscosity information of the first polymerization solution C is successively acquired from the differential pressure. In addition, an in-line infrared spectrometer is installed at the outlet of the first reaction part 30, and the infrared spectroscopy information of the first polymerization solution C is successively acquired. A judgment is made about which of the tetracarboxylic dianhydride and the diamine is excessive on the basis of the absorbance information that is detected when there is an excess monomer. To increase the viscosity, the flow ratio may be controlled such that the tetracarboxylic dianhydride/diamine ratio approaches the equivalent ratio.

(7) Example 7

It is assumed that the first polymerization solution C at the outlet of the first reaction part 30 has a viscosity lower than the set value. An in-line viscometer is installed at the outlet of the first reaction part 30, and the viscosity information of the first polymerization solution C is successively acquired. The flow rate of the first solution A1 or the second solution A2 is then decreased to examine whether the viscosity increases or decreases. After establishing the correlation between the flow rate change and the viscosity change, the flow ratio may be controlled to increase the viscosity.

(8) Example 8

A calibration curve is made between the viscosity of the polyamic acid solution serving as the first solution A1 and the tetracarboxylic dianhydride/diamine ratio in the first solution A1. After a tetracarboxylic dianhydride/diamine ratio leading to the target viscosity is determined, the amount of the second solution A2 to be added to the first solution A1 can be calculated. An in-line viscometer is installed at the outlet of the first supply pump 15, and the viscosity information of the first solution A1 is successively acquired. The amount of the second solution A2 to be added so that the viscosity at the outlet of the first reaction part 30 can reach the target viscosity is calculated from the viscosity information of the first solution A1, and the feed rate of the second solution A2 is adjusted to the calculated flow rate.

(9) Example 9

It is assumed that the second polymerization solution E at the outlet of the second reaction part 60 has a viscosity lower than the set value. An in-line viscometer is installed at the outlet of the second reaction part 60, and the viscosity information of the second polymerization solution E is successively acquired. In addition, an in-line absorption spectrometer is installed at the outlet of the second reaction part 60, and the absorbance information of the second polymerization solution E is successively acquired. An in-line viscometer is installed at the outlet of the first reaction part 30, and the viscosity information of the first polymerization solution C is successively acquired. In addition, an in-line absorption spectrometer is installed at the outlet of the first reaction part 30, and the absorbance information of the first polymerization solution C is successively acquired.

When the viscosity of the first polymerization solution C at the outlet of the first reaction part 30 is not the set value, a judgment is made about which of the tetracarboxylic dianhydride and the diamine is excessive on the basis of the absorbance information that is detected when there is an excess monomer. The flow rate of the second solution A2 is controlled to achieve the tetracarboxylic dianhydride/diamine ratio at which the viscosity of the first polymerization solution C can reach the set value. When the viscosity of the first polymerization solution C at the outlet of the first reaction part 30 is equal to the set value, a judgment is made about which of the tetracarboxylic dianhydride and the diamine is excessive on the basis of the absorbance information that is detected when there is an excess monomer. The flow rate of the third solution A3 is controlled to achieve the tetracarboxylic dianhydride/diamine ratio at which the viscosity of the second polymerization solution E can reach the set value.

Fifth Embodiment

A polyamic acid manufacturing system according to a fifth embodiment is described below with reference to FIGS. 13 to 15. The polyamic acid manufacturing system in the fifth embodiment includes one treatment part (reaction part), and the supply of the solution can be controlled on the basis of the flow rate variation of the raw material solution.

First, a polyamic acid manufacturing system 1D in the fifth embodiment is described below with reference to FIGS. 13 and 14. The components described in the first embodiment are not described here.

The polyamic acid manufacturing system 1D includes the first supply pump 15, a first flow control valve 151, and a first flow rate measurement part 152 located in this order from the upstream to the downstream between the first tank 11 and the first combining part 20.

The first supply pump 15 is a positive-displacement pump. For example, the positive-displacement pump is a plunger reciprocating pump, such as a plunger pump, or a rotation pump, such as a gear pump with a gear wheel.

The first supply pump 15 preferably has a low intrinsic pulsation rate (flow rate variation). Instead of or in addition to the first supply pump 15 with a low intrinsic pulsation rate (flow rate variation), a buffer (for example, an accumulator) against flow rate variations may preferably be placed on the liquid transfer line L. The buffer, such as an accumulator, can further reduce flow rate variations.

The first flow control valve 151 is located between the first supply pump 15 and the first combining part 20. The first flow control valve 151 can control the flow rate of the first solution A1 supplied by the first supply pump 15. In the present embodiment, the flow rate of the first solution A1 is controlled by the degree of opening of the first flow control valve 151. The degree of opening of the first flow control valve 151 is controlled by a first control part 200D described later.

The first flow rate measurement part 152 measures the flow rate of the first solution A1 on the downstream side of the first supply pump 15 in the first liquid transfer part L1. In the present embodiment, the first flow rate measurement part 152 is located between the first flow control valve 151 and the first combining part 20. The first flow rate measurement part 152 may be located upstream of the first flow control valve 151 and downstream of the first supply pump 15. The first flow rate measurement part 152 outputs the measured flow rate of the first solution A1 to the first control part 200D described later.

The polyamic acid manufacturing system 1D includes the second supply pump 16, a second flow control valve 161, and a second flow rate measurement part 162 located in this order from the upstream to the downstream between the second tank 12 and the first combining part 20 in the second liquid transfer part L2.

Like the first supply pump 15, the second supply pump 16 is a positive-displacement pump.

The second supply pump 16 preferably has a low intrinsic pulsation rate (flow rate variation). Instead of or in addition to the second supply pump 16 with a low intrinsic pulsation rate (flow rate variation), a buffer (for example, an accumulator) against flow rate variations may preferably be placed on the liquid transfer line L. The buffer, such as an accumulator, can further reduce flow rate variations.

The second flow control valve 161 is located between the second supply pump 16 and the first combining part 20. The second flow control valve 161 can control the flow rate of the second solution A2 supplied by the second supply pump 16. In the present embodiment, the flow rate of the second solution A2 is controlled by the degree of opening of the second flow control valve 161. The degree of opening of the second flow control valve 161 is controlled by the first control part 200D described later.

The second flow rate measurement part 162 measures the flow rate of the second solution A2 on the downstream side of the second supply pump 16 in the second liquid transfer part L2. In the present embodiment, the second flow rate measurement part 162 is located between the second flow control valve 161 and the first combining part 20. The second flow rate measurement part 162 may be located upstream of the second flow control valve 161 and downstream of the second supply pump 16. The second flow rate measurement part 162 outputs the measured flow rate of the second solution A2 to the first control part 200D described later.

The first control part 200D is described below. The first control part 200D is electrically connected to the first supply pump 15, the second supply pump 16, the first flow control valve 151, the first flow rate measurement part 152, the second flow control valve 161, and the second flow rate measurement part 162.

The first control part 200D controls the flow rate variations of the first solution A1 and/or the second solution A2 such that the peak flow rate of the first solution A1 is in synchronization with the peak flow rate of the second solution A2 (that is, the flow rate variation of the first solution A1 is in synchronization with the flow rate variation of the second solution A2).

The synchronization between the peak flow rates means substantially the same period of flow rate variations and allows a slight difference in phase. For example, the distance $L_1$ between adjacent peaks (crests) of the flow rate of the first solution A1 and the distance (that is, phase shift) $M_1$ between adjacent peaks (crests) of the flow rate of the first solution A1 and the flow rate of the second solution A2 preferably satisfy the following formula (1).

$$0 \le (M_1/L_1) \le 0.1 \tag{1}$$

Figure 14:
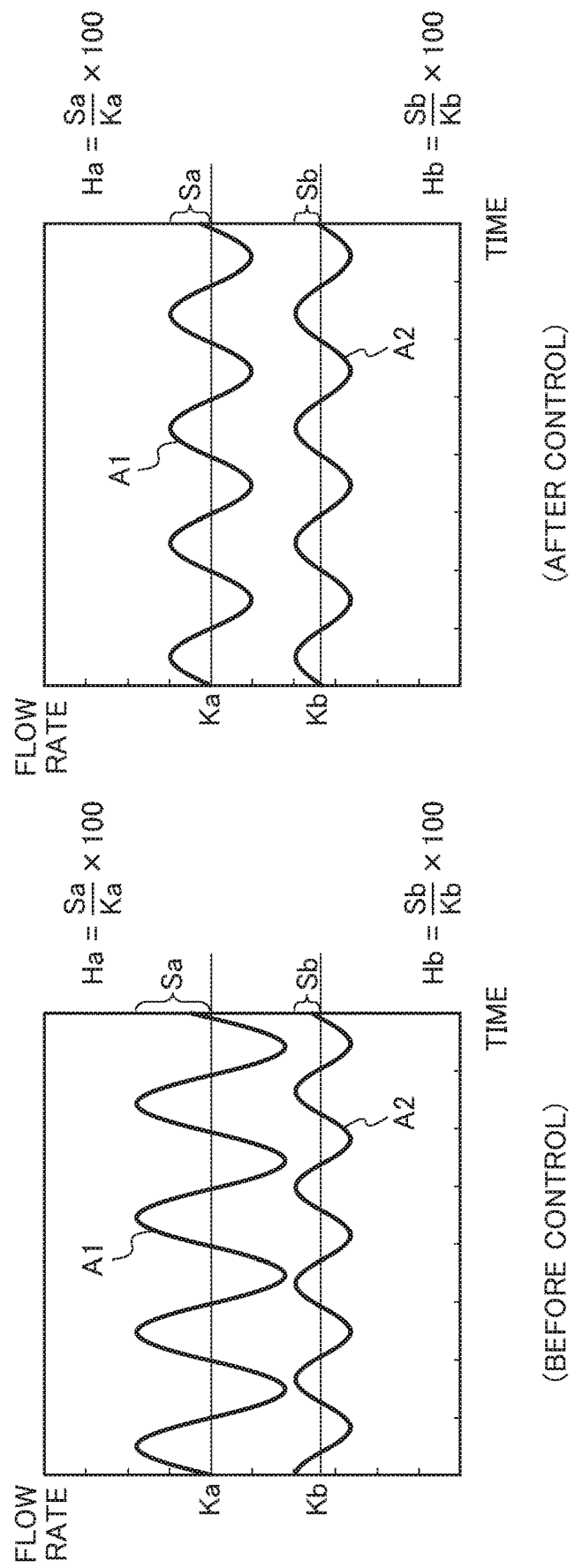
FIG. 14 is a flow waveform before or after control in the fifth embodiment.

For example, in the flow waveforms before control in FIG. 14, the flow rate variation of the first solution A1 is not in synchronization with the flow rate variation of the second solution A2. In this case, the first control part 200D controls the flow rate variations of the first solution A1 and/or the second solution A2 such that the flow rate variation of the first solution A1 is in synchronization with the flow rate variation of the second solution A2.

The flow rate variation of the first solution A1 and the flow rate variation of the second solution A2 can be synchronously controlled by the following method, for example. Plunger pumps are used as the first supply pump 15 and the second supply pump 16, and Coriolis mass flowmeters are used as the first flow rate measurement part 152 and the second flow rate measurement part 162. The first control part 200D instructs the first supply pump 15 and/or the second supply pump 16 on new stroke and rotation rate settings on the basis of the acquired flow rate information such that the flow rate variation of the first solution A1 is in synchronization with the flow rate variation of the second solution A2. In this manner, the flow rate variation of the first solution A1 and the flow rate variation of the second solution A2 can be synchronously controlled.

Although the flow rate variation of the first solution A1 has a fixed period in FIG. 14, the flow rate variation of the first solution A1 does not necessarily have a fixed period. More specifically, the distance between adjacent peaks (crests) of the flow rate of the first solution A1 is not necessarily fixed. Likewise, although the flow rate variation of the second solution A2 has a fixed period in FIG. 14, the flow rate variation of the second solution A2 does not necessarily have a fixed period. More specifically, the distance between adjacent peaks (crests) of the flow rate of the second solution A2 is not necessarily fixed.

Furthermore, the first control part 200D controls the flow rate variation of the first solution A1 (hereinafter also referred to as a "first flow rate variation") and/or the flow rate variation of the second solution A2 (hereinafter also referred to as a "second flow rate variation") so as to reduce the difference between the first flow rate variation and the second flow rate variation. In the present embodiment, the difference between the first flow rate variation and the second flow rate variation is preferably 3% or less, more preferably 1% or less, for example. The lower limit of the difference between the first flow rate variation and the second flow rate variation may be 0% but is preferably 0.001% or more. The first solution A1 and the second solution A2 tend to be well combined when the difference between the first flow rate variation and the second flow rate variation is 0.001% or more and when the first solution A1 and the second solution A2 are combined at a slightly different ratio.

In the present embodiment, for example, as shown in the flow waveforms before control in FIG. 14, the first flow rate variation Ha is defined as the ratio of the flow rate Sa corresponding to half of the amplitude of the flow rate variation to the flow rate Ka at the center of the amplitude of the flow rate variation (Ha=(Sa/Ka)×100 [%]). For example, the second flow rate variation Hb is defined as the ratio of the flow rate Sb corresponding to half of the amplitude of the flow rate variation to the flow rate Kb at the center of the amplitude of the flow rate variation (Hb=(Sb/Kb)×100 [%]). The difference x between the first flow rate variation Ha and the second flow rate variation Hb is the absolute difference between the first flow rate variation Ha and the second flow rate variation Hb (x=|Ha−Hb|). In the flow waveforms before control in FIG. 14, the first flow rate variation Ha is larger than the second flow rate variation Hb of the second solution A2 (Ha>Hb).

When the difference between the first flow rate variation Ha and the second flow rate variation Hb is outside the predetermined range, to reduce the difference between the first flow rate variation Ha and the second flow rate variation Hb, the first control part 200D controls the flow rate via the first flow control valve 151 and/or the second flow control valve 161 and controls the supply pressure of the solution supplied by the first supply pump 15 and/or the second supply pump 16. In the present embodiment, the difference between the first flow rate variation Ha and the second flow rate variation Hb is set in a predetermined range of 3% or less, for example.

To reduce the difference between the first flow rate variation Ha and the second flow rate variation Hb, the first control part 200D may decrease or increase the first flow rate variation Ha. The first control part 200D may also decrease or increase the second flow rate variation Hb.

This is because when the peak flow rate of the first solution A1 is in synchronization with the peak flow rate of the second solution A2 a small difference between the first flow rate variation Ha and the second flow rate variation Hb results in overlaps between peaks and overlaps between troughs of the flow rates in the peaks and troughs of the flow rate variations of the first solution A1 and the second solution A2, regardless of whether the first flow rate variation Ha is larger or smaller than the second flow rate variation Hb. In other words, this is because, when the first solution A1 is combined with the second solution A2, the peaks of the flow rate are combined, and the troughs of the flow rate are combined. Thus, control to decrease the difference between the first flow rate variation Ha and the second flow rate variation Hb can equalize the ratio of the first solution A1 to the second solution A2 regardless of whether the first flow rate variation Ha is larger or smaller than the second flow rate variation Hb.

For example, as shown in FIG. 14, to decrease the difference between the first flow rate variation Ha and the second flow rate variation Hb, the first control part 200 adjusts the first flow rate variation Ha to the second flow rate variation Hb, which has a smaller flow rate variation before control. Even if the first solution A1 is out of synchronization with the second solution A2 due to some factor, adjusting the first flow rate variation Ha to the smaller second flow rate variation Hb can minimize variations in the ratio of the first solution A1 to the second solution A2 and stabilize the ratio of the first solution A1 to the second solution A2.

More specifically, in the flow waveforms before control in FIG. 14, the first flow rate variation Ha is larger than the second flow rate variation Hb (Ha>Hb). Thus, the first control part 200D decreases the degree of opening of the first flow control valve 151 to reduce the first flow rate variation Ha. Furthermore, the first control part 200D increases the supply pressure (discharge pressure) of the first supply pump 15 to equalize the feed rate of the first supply pump 15 with the feed rate before the degree of opening of the first flow control valve 151 is decreased. This decreases the difference x between the first flow rate variation Ha and the second flow rate variation Hb (=|Ha−Hb|).

The first control part 200 does not necessarily adjust the first flow rate variation Ha to the smaller second flow rate variation Hb but may adjust the second flow rate variation Hb to the larger first flow rate variation Ha.

Next, the operation of the polyamic acid manufacturing system 1D according to the fifth embodiment is described below with reference to FIG. 15. First, in the polyamic acid manufacturing system 1D, when the operation starts, the first supply pump 15 supplies the first solution A1, and the second supply pump 16 supplies the second solution A2. The first control part 200D controls the supply pressures (discharge pressures) of the first supply pump 15 and the second supply pump 16 such that the first solution A1 and the second solution A2 are supplied at the desired ratio.

Figure 15:
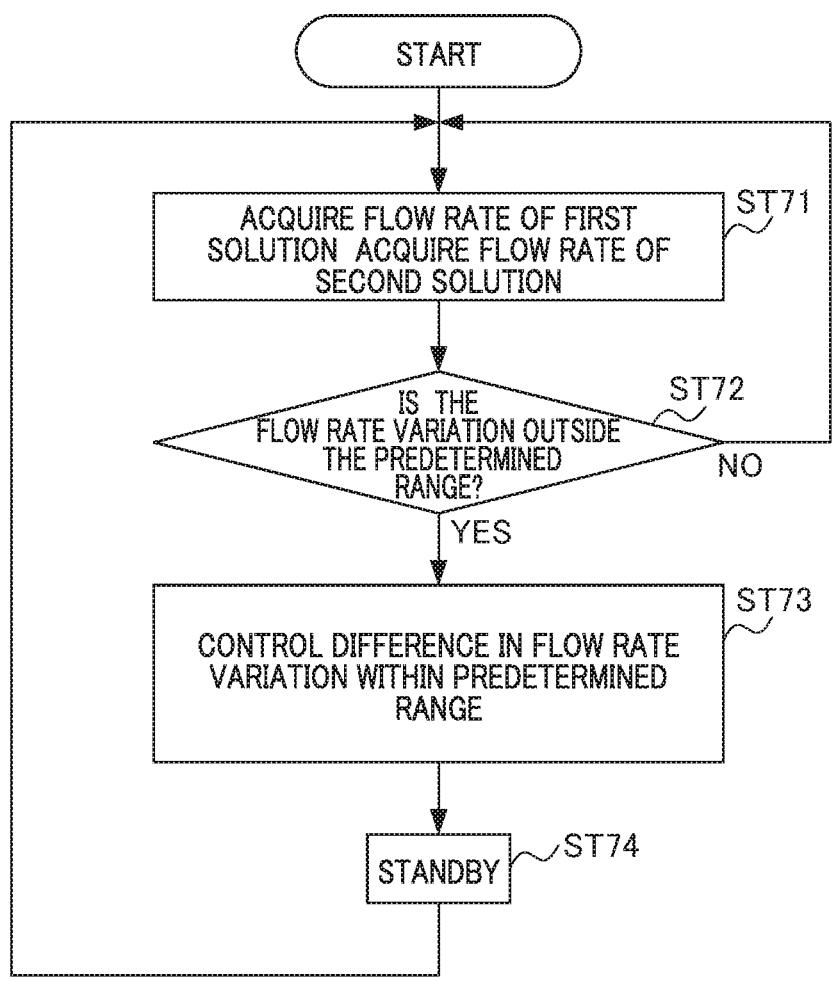
FIG. 15 is a flow chart of an operation of the polyamic acid manufacturing system according to the fifth embodiment.

Subsequently, as illustrated in FIG. 15, in the step ST71, the first flow rate measurement part 152 measures and acquires the flow rate of the first solution A1. The second flow rate measurement part 162 measures and acquires the flow rate of the second solution A2. In the present embodiment, the first control part 200D synchronously controls the flow rate variation of the first solution A1 and the flow rate variation of the second solution A2.

Subsequently, in the step ST72, the first control part 200D judges whether the difference between the first flow rate variation and the second flow rate variation is outside the predetermined range. In the present embodiment, the difference between the first flow rate variation and the second flow rate variation is set in a predetermined range of 3: or less, for example. This is because the desired polyamic acid can be consistently produced when the difference between the first flow rate variation and the second flow rate variation is 3% or less, for example.

In the case where the first control part 200D judges that the difference between the first flow rate variation and the second flow rate variation is outside the predetermined range (YES), the process proceeds to the step ST73. In the case where the first control part 200D judges that the difference between the first flow rate variation and the second flow rate variation is not outside the predetermined range (NO), the process returns to the step ST71.

Subsequently, in the step ST73, the first control part 200D controls the difference between the first flow rate variation and the second flow rate variation in the predetermined range. For example, in the flow waveforms before control in FIG. 14, the first flow rate variation Ha is larger than the second flow rate variation Hb (Ha>Hb). Thus, the first control part 200D decreases the degree of opening of the first flow control valve 151 to reduce the first flow rate variation Ha. Furthermore, the first control part 200D increases the supply pressure (discharge pressure) of the first supply pump 15 to equalize the feed rate of the first supply pump 15 with the feed rate before the degree of opening of the first flow control valve 151 is decreased. This results in the difference x between the first flow rate variation Ha and the second flow rate variation Hb (=|Ha−Hb|) in the predetermined range.

Because the peak flow rate of the first solution A1 is in synchronization with the peak flow rate of the second solution A2, the first solution A1 and the second solution A2 are combined under conditions where the peaks and troughs of the flow rate variations overlap each other. Thus, the control of the difference between the first flow rate variation and the second flow rate variation in the predetermined range can equalize the ratio of the first solution A1 to the second solution A2, and the desired polyamic acid can be consistently produced.

The first control part 200D then goes into standby (step ST74). The process then returns to the step ST71.

The polyamic acid manufacturing system 1D in the present embodiment has the following advantages in addition to the advantages of the first embodiment.

The polyamic acid manufacturing system 1D includes the first control part 200D for controlling the supply of the first solution A1 and/or the second solution A2 such that the flow rate variation of the first solution A1 is in synchronization with the flow rate variation of the second solution A2 and that the difference between the first flow rate variation and the second flow rate variation is decreased. Thus, the polyamic acid manufacturing system 1D can synchronize the flow rate variation of the first solution A1 with the flow rate variation of the second solution A2, decrease the difference between the first flow rate variation and the second flow rate variation, and more consistently manufacture a desired polyamic acid.

Sixth Embodiment

Figure 16:
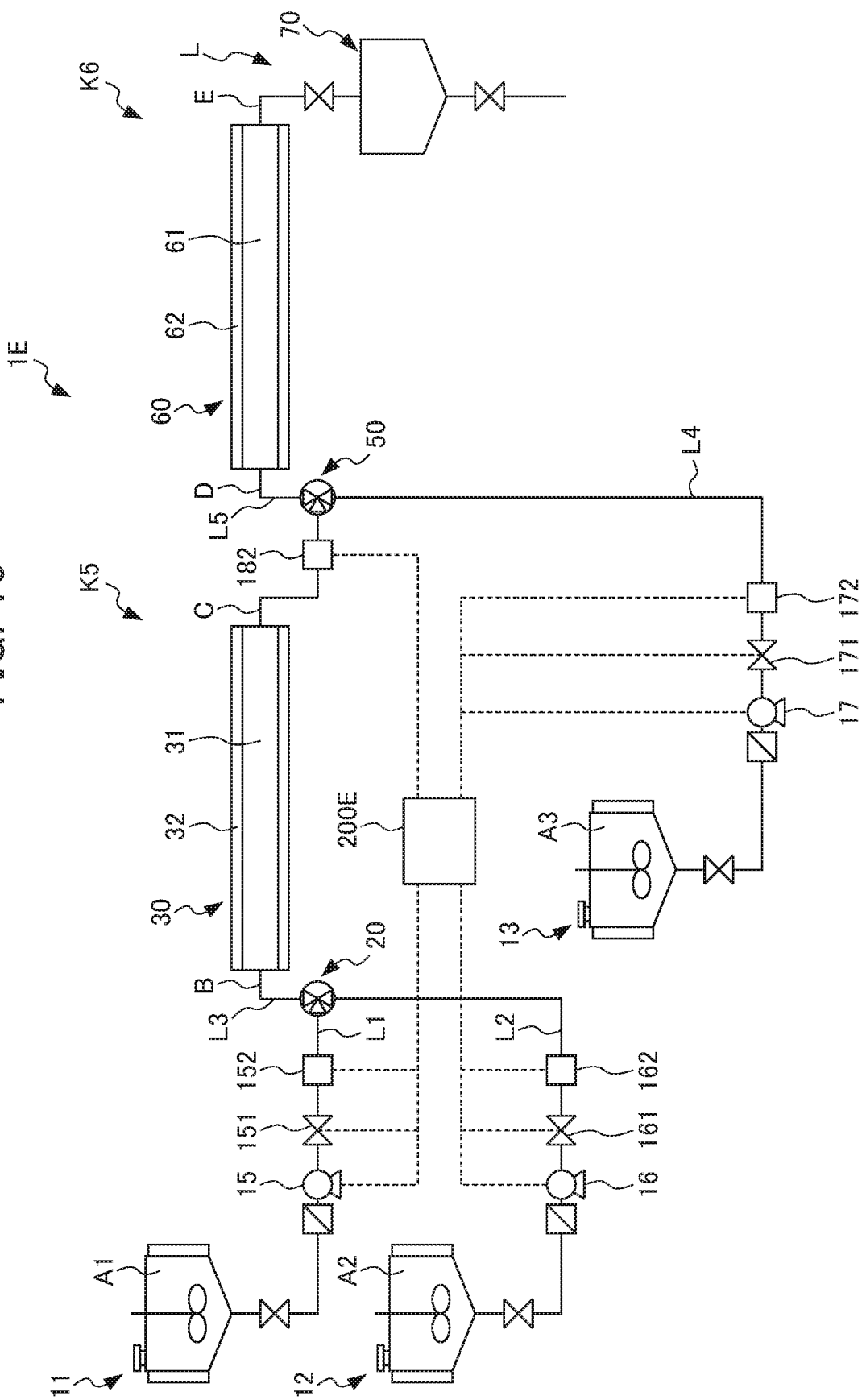
FIG. 16 is a schematic view of a polyamic acid manufacturing system according to a sixth embodiment.

A polyamic acid manufacturing system according to a sixth embodiment is described below with reference to FIGS. 16 and 17. The polyamic acid manufacturing system in the sixth embodiment includes two treatment parts (reaction parts), and the supply of the solution can be controlled on the basis of the flow rate variation of the raw material solution.

First, a polyamic acid manufacturing system 1E according to the sixth embodiment is described below with reference to FIG. 16. As illustrated in FIG. 16, the polyamic acid manufacturing system 1E includes a first treatment part K5 and a second treatment part K6.

The first treatment part K5 is the same as in the polyamic acid manufacturing system 1D according to the fifth embodiment and is not described in detail in the present embodiment. Components of the second treatment part K6 described in the second embodiment are not described in detail in the present embodiment.

The polyamic acid manufacturing system 1E includes the third supply pump 17, a third flow control valve 171, and a third flow rate measurement part 172 located in this order from the upstream to the downstream between the third tank 13 and the second combining part 50.

Like the first supply pump 15, the third supply pump 17 is a positive-displacement pump.

The third supply pump 17 preferably has a low intrinsic pulsation rate (flow rate variation). Instead of or in addition to the third supply pump 17 with a low intrinsic pulsation rate (flow rate variation), a buffer (for example, an accumulator) against flow rate variations may preferably be placed on the liquid transfer line L. The buffer, such as an accumulator, can further reduce flow rate variations.

The third flow control valve 171 is located between the third supply pump 17 and the second combining part 50. The third flow control valve 171 can control the flow rate of the third solution A3 supplied by the third supply pump 17. In the present embodiment, the flow rate of the third solution A3 is controlled by the degree of opening of the third flow control valve 171. The degree of opening of the third flow control valve 171 is controlled by a second control part 200E described later.

The third flow rate measurement part 172 measures the flow rate of the third solution A3 on the downstream side of the third supply pump 17 in the fourth liquid transfer part L4. In the present embodiment, the third flow rate measurement part 172 is located between the third flow control valve 171 and the second combining part 50. The third flow rate measurement part 172 may be located upstream of the third flow control valve 171 and downstream of the third supply pump 17. The third flow rate measurement part 172 outputs the measured flow rate of the third solution A3 to the second control part 200E described later.

The polyamic acid manufacturing system 1E also includes a fourth flow rate measurement part 182 between the first reaction part 30 and the second combining part 50.

The fourth flow rate measurement part 182 measures the flow rate of the first polymerization solution C on the downstream side of the first reaction part 30 in the third liquid transfer part L3. The fourth flow rate measurement part 182 outputs the measured flow rate of the first polymerization solution C to the second control part 200E described later.

The second control part 200E is described below. The second control part 200E is electrically connected to the first supply pump 15, the second supply pump 16, the first flow control valve 151, the first flow rate measurement part 152, the second flow control valve 161, the second flow rate measurement part 162, the third flow control valve 171, the third flow rate measurement part 172, and the fourth flow rate measurement part 182.

Although the second control part 200E also has the functions of the first control part 200D of the fifth embodiment, the functions described in the first control part 200D are not described here in detail.

The second control part 200E controls the flow rate variations of the first polymerization solution C and/or the third solution A3 such that the peak flow rate of the first polymerization solution C is in synchronization with the peak flow rate of the third solution A3 (that is, the flow rate variation of the first polymerization solution C is in synchronization with the flow rate variation of the third solution A3).

The synchronization between the peak flow rates means substantially the same period of flow rate variations and allows a slight difference in phase. For example, the distance $L_2$ between adjacent peaks (crests) of the flow rate of the first polymerization solution C and the distance (that is, phase shift) $M_2$ between adjacent peaks (crests) of the flow rate of the first polymerization solution C and the flow rate of the third solution A3 preferably satisfy the following formula (2).

$$0 \leq (M_2/L_2) \leq 0.1 \qquad (2)$$

The flow rate variation of the first polymerization solution C and the flow rate variation of the third solution A3 can be synchronously controlled by the following method, for example. Plunger pumps are used as the first supply pump 15, the second supply pump 16, and the third supply pump 17, and Coriolis mass flowmeters are used as the third flow rate measurement part 172 and the fourth flow rate measurement part 182. The second control part 200E instructs the third supply pump 17 on new stroke and rotation rate settings on the basis of the acquired flow rate information such that the flow rate variation of the first polymerization solution C is in synchronization with the flow rate variation of the third solution A3. In this manner, the flow rate variation of the first polymerization solution C and the flow rate variation of the third solution A3 can be synchronously controlled.

As in the fifth embodiment, the flow rate variation of the first polymerization solution C and the flow rate variation of the third solution A3 do not necessarily have a fixed period.

Furthermore, the second control part 200E controls the flow rate variation of the third solution A3 (hereinafter also referred to as a "third flow rate variation") so as to decrease the difference between the flow rate variation of the first polymerization solution C (hereinafter also referred to as a "polymerization solution flow rate variation") and the third flow rate variation. In the present embodiment, the difference between the polymerization solution flow rate variation and the third flow rate variation is preferably 3% or less, more preferably 1% or less, for example. The lower limit of the difference between the polymerization solution flow rate variation and the third flow rate variation may be 0% but is preferably 0.001% or more. The first polymerization solution C and the third solution A3 tend to be well combined when the difference between the polymerization solution flow rate variation and the third flow rate variation is 0.001% or more and when the first polymerization solution C and the third solution A3 are combined at a slightly different ratio.

In the present embodiment, in the same way of thinking as the first flow rate variation Ha and the second flow rate variation Hb in the fifth embodiment, for example, the polymerization solution flow rate variation Hc is defined as the ratio of the flow rate Sc corresponding to half of the amplitude of the flow rate variation to the flow rate Kc at the center of the amplitude of the flow rate variation (Hc=(Sc/Kc)×100 [%]). For example, the third flow rate variation Hd is defined as the ratio of the flow rate Sd corresponding to half of the amplitude of the flow rate variation to the flow rate Kd at the center of the amplitude of the flow rate variation (Hd=(Sd/Kd)×100 [%]). In the same way of thinking as the difference x between the first flow rate variation Ha and the second flow rate variation Hb in the fifth embodiment, the difference y between the polymerization solution flow rate variation Hc and the third flow rate variation Hd is the absolute difference between the polymerization solution flow rate variation Hc and the third flow rate variation Hd (y=|Hc−Hd|).

When the difference between the polymerization solution flow rate variation Hc and the third flow rate variation Hd is outside the predetermined range, to reduce the difference between the polymerization solution flow rate variation Hc and the third flow rate variation Hd, the second control part 200E controls the flow rate of the third solution A3 via the third flow control valve 171 and controls the supply pressure of the solution supplied by the third supply pump 17. In the present embodiment, the difference between the polymerization solution flow rate variation Hc and the third flow rate variation Hd is set in a predetermined range of 3% or less, for example.

To reduce the difference between the polymerization solution flow rate variation Hc and the third flow rate variation Hd, the second control part 200E may decrease or increase the third flow rate variation Hd.

This is because when the peak flow rate of the polymerization solution flow rate variation Hc is in synchronization with the peak flow rate of the third flow rate variation Hd a small difference between the polymerization solution flow rate variation Hc and the third flow rate variation Hd results in overlaps between peaks and overlaps between troughs of the flow rates in the peaks and troughs of the flow rate variations of the first polymerization solution C and the third solution A3, regardless of whether the polymerization solution flow rate variation Hc is larger or smaller than the third flow rate variation Hd. In other words, this is because when the first polymerization solution C is combined with the third solution A3 the peaks of the flow rate are combined, and the troughs of the flow rate are combined. Thus, control to decrease the difference between the polymerization solution flow rate variation Hc and the third flow rate variation Hd can equalize the ratio of the first polymerization solution C to the third solution A3 regardless of whether the polymerization solution flow rate variation Hc is larger or smaller than the third flow rate variation Hd.

Next, the operation of the polyamic acid manufacturing system 1E according to the sixth embodiment is described below with reference to FIG. 17. First, in the polyamic acid manufacturing system 1E, when the operation starts, the first supply pump 15 supplies the first solution A1, the second supply pump 16 supplies the second solution A2, and the third supply pump 17 supplies the third solution A3. The second control part 200E controls the supply pressures (discharge pressures) of the first supply pump 15 and the second supply pump 16 such that the first solution A1 and the second solution A2 are supplied at the desired ratio. The second control part 200E controls the supply pressure (discharge pressure) of the third supply pump 17 such that the third solution A3 is supplied at the desired ratio.

Figure 17:
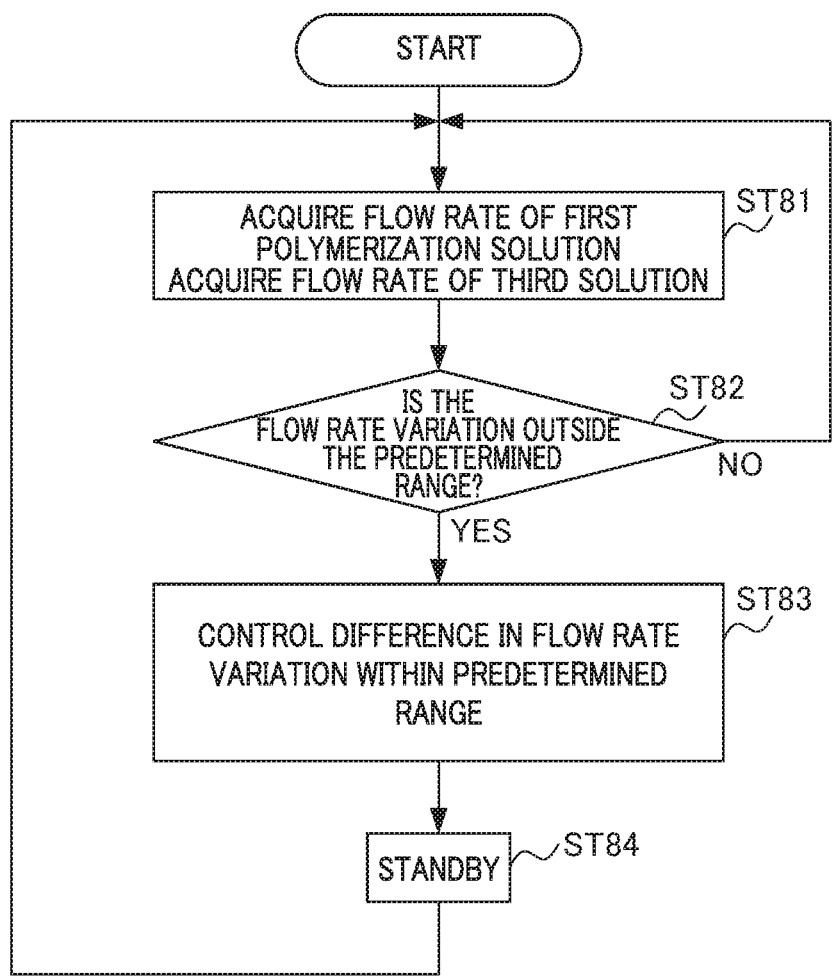
FIG. 17 is a flow chart of an operation of the polyamic acid manufacturing system according to the sixth embodiment.

Subsequently, as illustrated in FIG. 17, in the step ST81, the fourth flow rate measurement part 182 measures and acquires the flow rate of the first polymerization solution C. The third flow rate measurement part 172 measures and acquires the flow rate of the third solution A3. In the present embodiment, the second control part 200E synchronously controls the flow rate variation of the first polymerization solution C and the flow rate variation of the third solution A3.

Subsequently, in the step ST82, the second control part 200E judges whether the difference between the polymerization solution flow rate variation and the third flow rate variation is outside the predetermined range. In the present embodiment, the difference between the polymerization solution flow rate variation and the third flow rate variation is set in a predetermined range of 3% or less, for example. This is because the desired polyamic acid can be consistently produced when the difference between the polymerization solution flow rate variation and the third flow rate variation is 31 or less, for example.

In the case where the second control part 200E judges that the difference between the polymerization solution flow rate variation and the third flow rate variation is outside the predetermined range (YES), the process proceeds to the step ST83. In the case where the second control part 200E judges that the difference between the polymerization solution flow rate variation and the third flow rate variation is not outside the predetermined range (NO), the process returns to the step ST81.

Subsequently, in the step ST83, the second control part 200E controls the difference between the polymerization solution flow rate variation and the third flow rate variation in the predetermined range. For example, the second control part 200E decreases or increases the degree of opening of the third flow control valve 171 and decreases or increases the supply pressure (discharge pressure) of the third supply pump 17 to equalize the feed rate of the third solution A3 with the feed rate before the degree of opening of the third flow control valve 171 is decreased or increased. This decreases or increases the third flow rate variation after the control, resulting in a difference y between the polymerization solution flow rate variation and the third flow rate variation in the predetermined range.

Because the peak flow rate of the first polymerization solution C is in synchronization with the peak flow rate of the third solution A3, the first polymerization solution C and the third solution A3 are combined under conditions where the peaks and troughs of the flow rate variations overlap each other. Thus, the control of the difference between the polymerization solution flow rate variation and the third flow rate variation in the predetermined range can equalize the ratio of the first polymerization solution C to the third solution A3, and the desired polyamic acid can be consistently produced.

The second control part 200E then goes into standby (step ST84). The process then returns to the step ST81.

The polyamic acid manufacturing system 1E in the present embodiment has the following advantages in addition to the advantages of the second embodiment.

The polyamic acid manufacturing system 1E includes the second control part 200E for controlling the supply of the third solution A3 such that the flow rate variation of the first polymerization solution C is in synchronization with the flow rate variation of the third solution A3 and that the difference between the polymerization solution flow rate variation and the third flow rate variation is decreased. The polyamic acid manufacturing system 1E can synchronize the flow rate variation of the first polymerization solution C with the flow rate variation of the third solution A3, decrease the difference between the polymerization solution flow rate variation and the third flow rate variation, and more consistently manufacture a desired polyamic acid.

Seventh Embodiment

A polyamic acid manufacturing system according to a seventh embodiment is described below with reference to FIGS. 18 and 20. The polyamic acid manufacturing system in the seventh embodiment includes one treatment part (reaction part), and the supply of the solution can be controlled on the basis of the flow rate variation of the raw material solution.

A polyamic acid manufacturing system 1F according to the seventh embodiment is described below with reference to FIGS. 18 and 19. The polyamic acid manufacturing system 1F is the same as in the fifth embodiment except for the first control part 200F. Thus, the components other than the first control part 200F are not described here.

In the present embodiment, as in the first embodiment, the first polymerizable compound in the first solution A1 is a tetracarboxylic dianhydride, and the second polymerizable compound in the second solution A2 is a diamine.

The first control part 200F controls the first supply pump 15 and/or the second supply pump 16 such that the mole ratio of the tetracarboxylic dianhydride in the first solution A1 to the diamine in the second solution A2 is within a predetermined range. For example, the mole ratio is determined such that a polyamic acid with desired properties can be produced.

In the present embodiment, for example, the number of moles of the diamine preferably ranges from 95 to 105, more preferably 97.5 to 102.5, when the number of moles of the diamine equivalent to the number of moles of the tetracarboxylic dianhydride is 100.

In the present embodiment, when the mole ratio of the tetracarboxylic dianhydride to the diamine is an equivalent ratio, the polyamic acid has a maximum molecular weight, and the first polymerization solution C has a maximum viscosity. As the mole ratio of the tetracarboxylic dianhydride to the diamine deviates from the equivalent ratio, the molecular weight of the polyamic acid decreases greatly, and the viscosity of the first polymerization solution C also decreases greatly. Thus, the molecular weight of the polyamic acid and the viscosity of the first polymerization solution C change greatly with the mole ratio of the tetracarboxylic dianhydride to the diamine due to the intrinsic pulsation of the first supply pump 15 and the second supply pump 16. Thus, variations in the viscosity of the first polymerization solution C result in variations in the flow rate (pulsation) of the first polymerization solution C and accordingly variations in the flow rate (pulsation) of the first solution A1 and the second solution A2. The flow rate variations (pulsation) increase with viscosity.

A sufficiently high back pressure on the solution flowing through the liquid transfer line L results in a decrease in the flow rate variation (pulsation) of the first polymerization solution C resulting from variations in viscosity and accordingly a decrease in the flow rate variations (pulsation) of the first solution A1 and the second solution A2. However, the intrinsic pulsation of the first supply pump 15 and the second supply pump 16 is superimposed on the flow rate variations (pulsation) of the first solution A1 and the second solution A2, and the flow rates of the first solution A1 and the second solution A2 vary complexly. In the present embodiment, the first control part 200F performs various controls to continuously and consistently manufacture a desired polyamic acid even under such circumstances.

The first control part 200F is electrically connected to the first supply pump 15, the second supply pump 16, the first flow control valve 151, the first flow rate measurement part 152, the second flow control valve 161, and the second flow rate measurement part 162.

The first control part 200F controls the flow rate variation of the first solution A1 (the first flow rate variation) to the first threshold or below and controls the flow rate variation of the second solution A2 (the second flow rate variation) to the second threshold or below. In the present embodiment, the first flow rate variation and/or the second flow rate variation is preferably 3' or less, more preferably 2.5% or less, for example. The first flow rate variation and/or the second flow rate variation may have any lower limit, for example, 0.01%.

For example, in the case where the first flow rate variation Ha is larger than the first threshold TH1, as illustrated by the flow waveforms before control in FIG. 19, the first control part 200F decreases the degree of opening of the first flow control valve 151 to decrease the first flow rate variation Ha to the first threshold TH1 or below and increases the supply pressure of the solution supplied by the first supply pump 15 such that the feed rate of the first solution A1 is the same as the feed rate before the degree of opening of the first flow control valve 151 is controlled. In the case where the second flow rate variation Hb is larger than the second threshold TH2, the first control part 200F decreases the degree of opening of the second flow control valve 161 to decrease the second flow rate variation Hb to the second threshold TH2 or below and increases the supply pressure of the solution supplied by the second supply pump 16 such that the feed rate of the second solution A2 is the same as the feed rate before the degree of opening of the second flow control valve 161 is controlled. Thus, as illustrated by the flow waveforms after control in FIG. 19, the first flow rate variation Ha is controlled to the first threshold TH1 or below (Ha TH1), and the second flow rate variation Hb is controlled to the second threshold TH2 or below (Hb TH2). In the present embodiment, the first threshold TH1 of the first flow rate variation Ha and the second threshold TH2 of the second flow rate variation Hb are preferably 3%, more preferably 2.5%, for example.

Thus, controlling the supply pressure of the solution supplied by the first supply pump 15 and/or the second supply pump 16 according to the degree of opening of the first flow control valve 151 and/or the second flow control valve 161 enables the first solution A1 to be combined with the second solution A2 without changing the ratio of the tetracarboxylic dianhydride in the first solution A1 to the diamine in the second solution A2.

Next, the operation of the polyamic acid manufacturing system 1F according to the seventh embodiment is described below with reference to FIG. 20. First, in the polyamic acid manufacturing system 1F, when the operation starts, the first supply pump 15 supplies the first solution A1, and the second supply pump 16 supplies the second solution A2. The first control part 200F controls the supply pressures (discharge pressures) of the first supply pump 15 and the second supply pump 16 such that the first solution A1 and the second solution A2 are supplied at the desired ratio.

Figure 20:
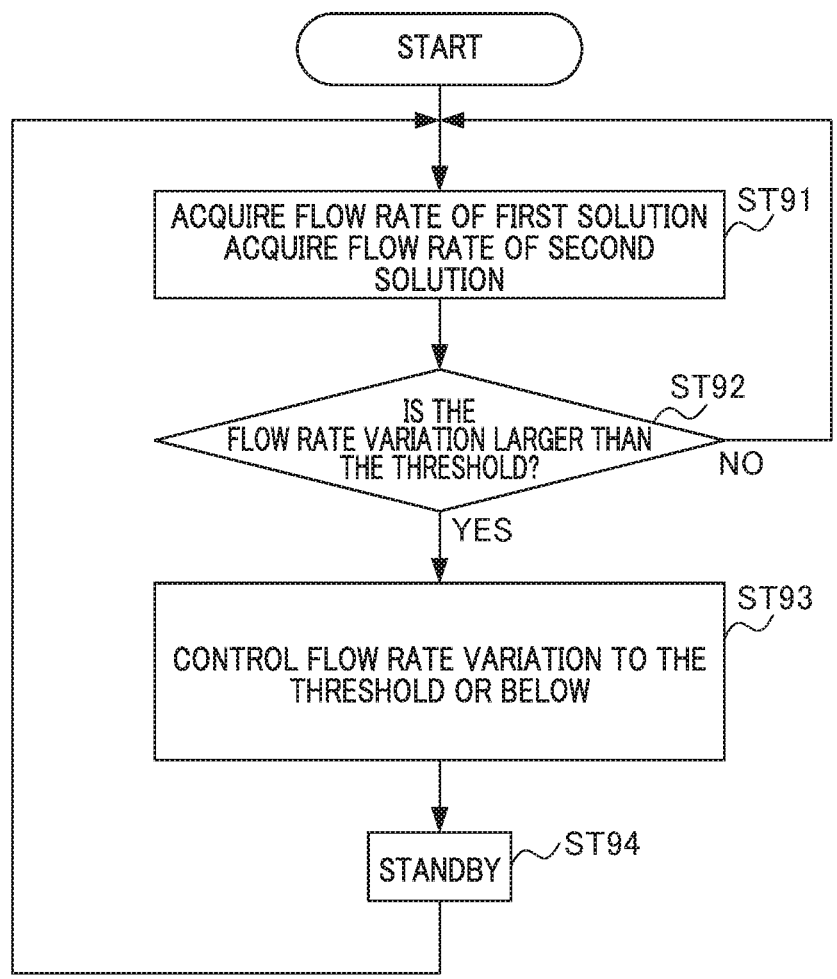
FIG. 20 is a flow chart of an operation of the polyamic acid manufacturing system according to the seventh embodiment.

Subsequently, as illustrated in FIG. 20, in the step ST91, the first flow rate measurement part 152 measures and acquires the flow rate of the first solution A1. The second flow rate measurement part 162 measures and acquires the flow rate of the second solution A2.

Subsequently, in the step ST92, the first control part 200F judges whether the first flow rate variation is larger than the first threshold and whether second flow rate variation is larger than the second threshold. In the present embodiment, the first threshold and the second threshold are set at 3%, for example. This is because the desired polyamic acid can be consistently produced when the first flow rate variation and the second flow rate variation are 3% or less.

In the case where the first control part 200F judges that the first flow rate variation is larger than the first threshold or the second flow rate variation is larger than the second threshold (YES), the process proceeds to the step ST93. In the case where the first control part 200F judges that the first flow rate variation is the first threshold or below, and the second flow rate variation is the second threshold or below (NO), the process returns to the step ST91.

Subsequently, in the step ST93, the first control part 200F controls the first flow rate variation and/or the second flow rate variation. In the case where the first flow rate variation is larger than the first threshold, the first control part 200F decreases the degree of opening of the first flow control valve 151 to decrease the first flow rate variation to the first threshold or below and increases the supply pressure of the solution supplied by the first supply pump 15 such that the feed rate of the first solution A1 is the same as the feed rate before the degree of opening of the first flow control valve 151 is controlled. In the case where the second flow rate variation is larger than the second threshold, the first control part 200F decreases the degree of opening of the second flow control valve 161 to decrease the second flow rate variation to the second threshold or below and increases the supply pressure of the solution supplied by the second supply pump 16 such that the feed rate of the second solution A2 is the same as the feed rate before the degree of opening of the second flow control valve 161 is controlled. Thus, as illustrated in FIG. 19, the first flow rate variation Ha after control is the first threshold TH1 or below (Ha TH1), and the second flow rate variation Hb after control is the second threshold TH2 or below (Hb TH2).

The first control part 200F then goes into standby (step ST94). The process then returns to the step ST91.

The polyamic acid manufacturing system 1F in the present embodiment has the following advantages in addition to the advantages of the first embodiment.

The polyamic acid manufacturing system 1F includes the first control part 200F that controls the first flow rate variation to the first threshold or below and controls the second flow rate variation to the second threshold or below. Thus, the polyamic acid manufacturing system 1F can decrease the first flow rate variation and the second flow rate variation and can therefore more consistently manufacture a desired polyamic acid.

Eighth Embodiment

Figure 21:
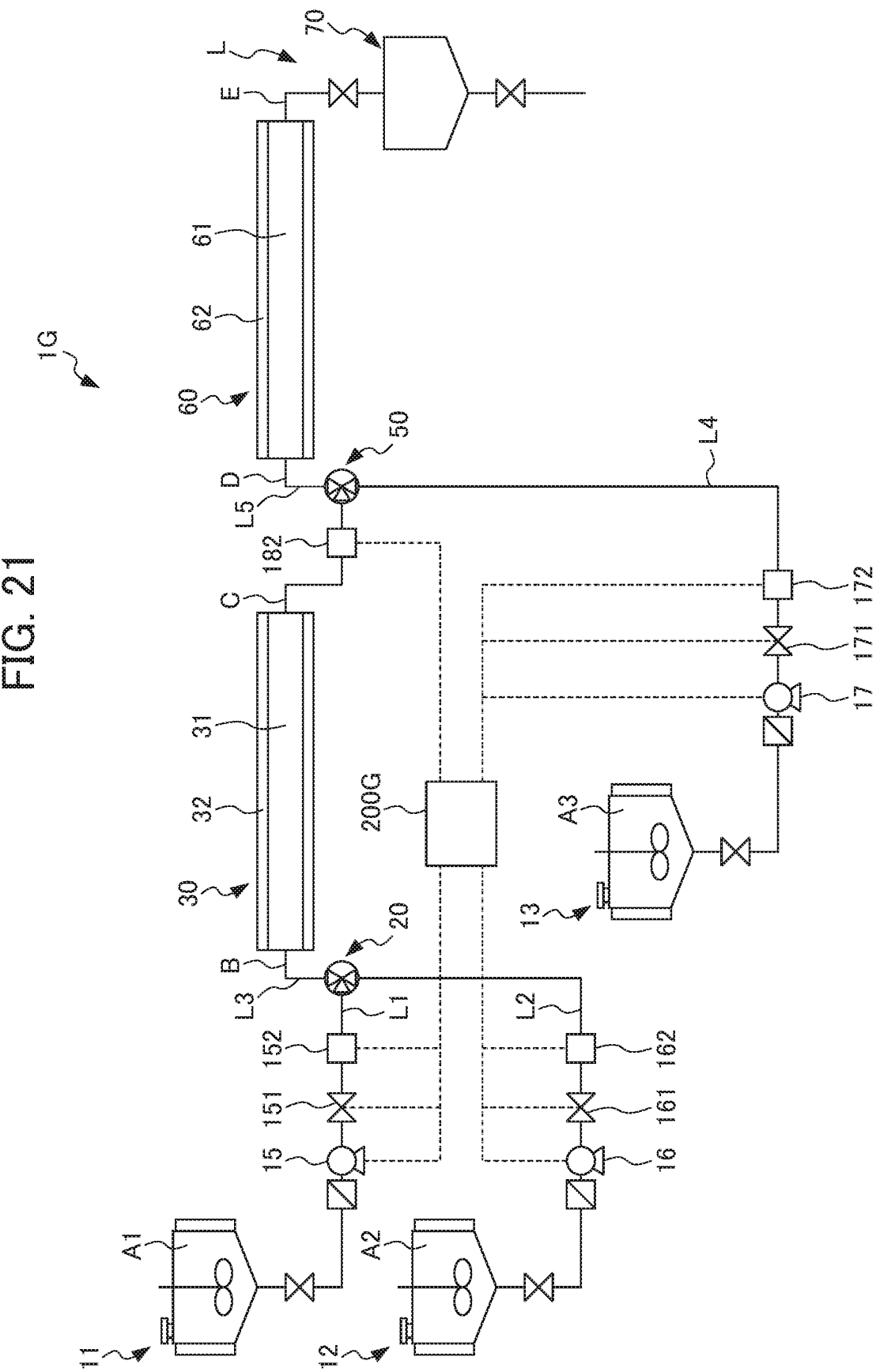
FIG. 21 is a schematic view of a polyamic acid manufacturing system according to an eighth embodiment.

A polyamic acid manufacturing system according to an eighth embodiment is described below with reference to FIGS. 21 and 22. The polyamic acid manufacturing system in the eighth embodiment includes two treatment parts (reaction parts), and the supply of the solution can be controlled on the basis of the flow rate variation of the raw material solution.

A polyamic acid manufacturing system 1G according to the eighth embodiment is described below with reference to FIG. 21. The polyamic acid manufacturing system 1G is the same as in the sixth embodiment except for the second control part 200G. Thus, the components other than the second control part 200G are not described here.

In the present embodiment, as in the second embodiment, the polyamic acid in the first polymerization solution C is a polyamic acid with a terminal acid anhydride group, and the polymerizable compound in the third solution A3 is a diamine.

The second control part 200G controls the third supply pump 17 such that the mole ratio of the polyamic acid with a terminal acid anhydride group in the first polymerization solution C to the diamine in the third solution A3 is within a predetermined range. For example, the mole ratio is determined such that a polyamic acid with desired properties can be produced.

In the present embodiment, the number of moles of the diamine preferably ranges from 95 to 105, more preferably 97.5 to 102.5, when the number of moles of the diamine equivalent to the number of moles of the polyamic acid with a terminal acid anhydride group is 100.

In the present embodiment, when the mole ratio of the polyamic acid with a terminal acid anhydride group to the diamine is an equivalent ratio, the polyamic acid has a maximum molecular weight, and the second polymerization solution E has a maximum viscosity. As the mole ratio of the polyamic acid with a terminal acid anhydride group to the diamine deviates from the equivalent ratio, the molecular weight of the polyamic acid decreases greatly, and the viscosity of the second polymerization solution E also decreases greatly. Thus, the molecular weight of the polyamic acid and the viscosity of the second polymerization solution E change greatly with the mole ratio of the polyamic acid with a terminal acid anhydride group to the diamine due to the intrinsic pulsation of the third supply pump 17. Thus, variations in the viscosity of the second polymerization solution E result in variations in the flow rate (pulsation) of the second polymerization solution E and accordingly variations in the flow rate (pulsation) of the third solution A3. The flow rate variations (pulsation) increase with viscosity.

A sufficiently high back pressure on the solution flowing through the liquid transfer line L results in a decrease in the flow rate variation (pulsation) of the second polymerization solution E resulting from variations in viscosity and accordingly a decrease in the flow rate variations (pulsation) of the third solution A3. However, the intrinsic pulsation of the third supply pump 17 is superimposed on the flow rate variations (pulsation) of the third solution A3, and the flow rate of the third solution A3 varies complexly. In the present embodiment, the second control part 200G performs various controls to continuously and consistently manufacture a desired polyamic acid even under such circumstances.

The second control part 200G is electrically connected to the first supply pump 15, the second supply pump 16, the first flow control valve 151, the first flow rate measurement part 152, the second flow control valve 161, the second flow rate measurement part 162, the third flow control valve 171, the third flow rate measurement part 172, and the fourth flow rate measurement part 182.

Although the second control part 200G also has the functions of the first control part 200F of the seventh embodiment, the functions described in the first control part 200F are not described here in detail.

The second control part 200G controls the flow rate variation of the third solution A3 (third flow rate variation) to the third threshold or below. In the present embodiment, the third flow rate variation is preferably 3% or less, more preferably 2.5% or less, for example. The third flow rate variation may have any lower limit, for example, 0.01%.

For example, in the case where the third flow rate variation is larger than the third threshold, the second control part 200G decreases the degree of opening of the third flow control valve 171 to decrease the third flow rate variation to the third threshold or below and increases the supply pressure of the solution supplied by the third supply pump 17 such that the feed rate of the third solution A3 is the same as the feed rate before the degree of opening of the third flow control valve 171 is controlled. In the present embodiment, the third threshold of the third flow rate variation is preferably 3%, more preferably 2.5%, for example.

Thus, controlling the supply pressure of the solution supplied by the third supply pump 17 according to the degree of opening of the third flow control valve 171 enables the first polymerization solution C to be combined with the third solution A3 without changing the ratio of the polyamic acid with a terminal acid anhydride group in the first polymerization solution C to the diamine in the third solution A3.

Next, the operation of the polyamic acid manufacturing system 1G according to the eighth embodiment is described below with reference to FIG. 22. First, in the polyamic acid manufacturing system 1G, when the operation starts, the first supply pump 15 supplies the first solution A1, the second supply pump 16 supplies the second solution A2, and the third supply pump 17 supplies the third solution A3. The second control part 200G controls the supply pressures (discharge pressures) of the first supply pump 15 and the second supply pump 16 such that the first solution A1 and the second solution A2 are supplied at the desired ratio. The second control part 200G controls the supply pressure (discharge pressure) of the third supply pump 17 such that the third solution A3 is supplied at the desired ratio.

Figure 22:
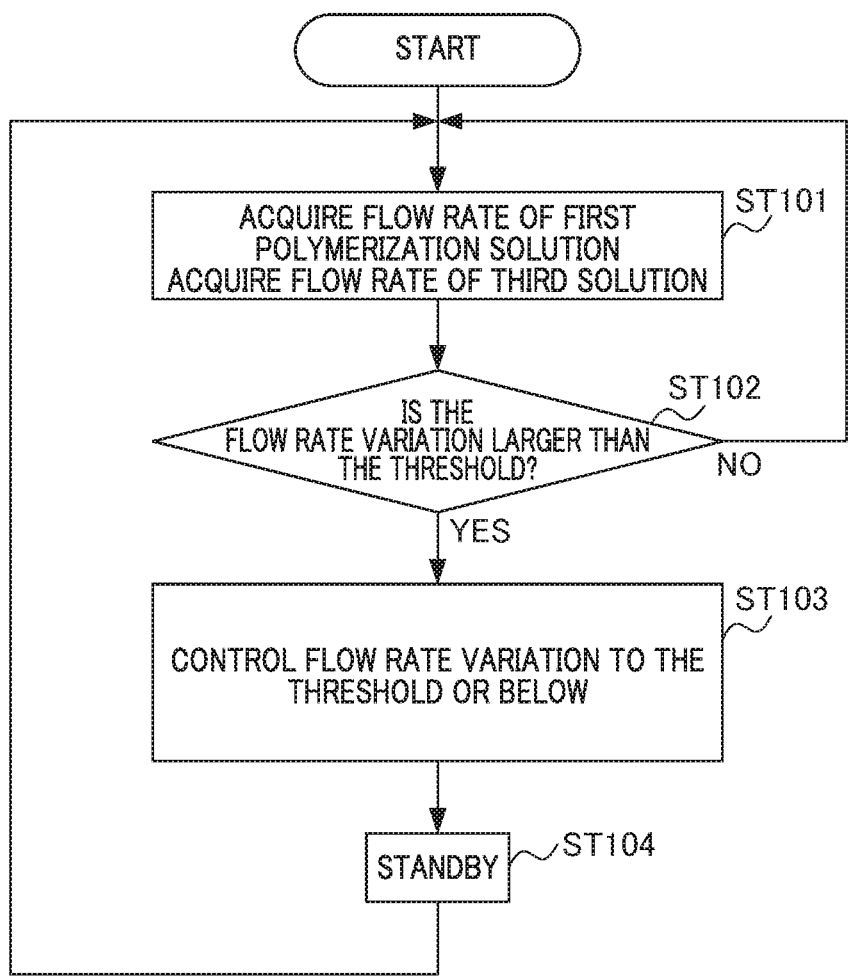
FIG. 22 is a flow chart of an operation of the polyamic acid manufacturing system according to the eighth embodiment.

Subsequently, as illustrated in FIG. 22, in the step ST101, the fourth flow rate measurement part 182 measures and acquires the flow rate of the first polymerization solution C. The third flow rate measurement part 172 measures and acquires the flow rate of the third solution A3.

Subsequently, in the step ST102, the second control part 200G judges whether the third flow rate variation is larger than the third threshold. In the present embodiment, the third threshold is set at 3%, for example. This is because the desired polyamic acid can be consistently produced when the third flow rate variation is 3% or less.

In the case where the second control part 200G judges that the third flow rate variation is larger than the third threshold (YES), the process proceeds to the step ST103. In the case where the second control part 200G judges that the third flow rate variation is the third threshold or below (NO), the process returns to the step ST101.

Subsequently, in the step ST103, the second control part 200G decreases the degree of opening of the third flow control valve 171 to decrease the third flow rate variation to the third threshold or below and increases the supply pressure of the solution supplied by the third supply pump 17 such that the feed rate of the third solution A3 is the same as the feed rate before the degree of opening of the third flow control valve 171 is controlled. This decreases the third flow rate variation to the third threshold or below after control.

The second control part 200G then goes into standby (step ST104). The process then returns to the step ST101.

The polyamic acid manufacturing system 1G in the present embodiment has the following advantages in addition to the advantages of the second embodiment.

The polyamic acid manufacturing system 1G includes the second control part 200G that controls the third flow rate variation to the third threshold or below. The polyamic acid manufacturing system 1G can decrease the third flow rate variation and can therefore more consistently manufacture a desired polyamic acid.

MODIFIED EXAMPLES

The present invention is not limited to these embodiments and also includes modifications and improvements thereof that can achieve the objects of the present invention.

Although the above embodiments are described individually in the first to eighth embodiments, for convenience, these embodiments may be combined. For example, supply in the first supply pump 15 and/or the second supply pump 16 in the fifth or seventh embodiment may be controlled in the same manner as in the third embodiment on the basis of the first reaction information acquired by the first measurement part. In the fifth embodiment, the first flow rate variation may be controlled to the first threshold or below, and the second flow rate variation may be controlled to the second threshold or below, in the same manner as in the seventh embodiment.

Although the polyamic acid manufacturing system includes one or two treatment parts in the above embodiments, the polyamic acid manufacturing system may include three or more treatment parts. The polyamic acid manufacturing system may perform not only one- or two-step reaction but also three-or-more-step reaction. For example, the polyamic acid manufacturing system may include three or more sets of combining parts and reaction parts. The feed rate in the polyamic acid manufacturing system can be controlled in each treatment part such that the target reaction rate and quality can be accordingly achieved.

The first solution A1 and/or the second solution A2 in the polyamic acid manufacturing system may contain filler. Filler can be easily introduced into a polyamic acid to be manufactured by the addition of the filler to the first solution A1 and/or the second solution A2.

EXAMPLES

Although the present invention is further described in the following examples, the present invention is not limited to these examples.

Example 1

In Example 1, a polyamic acid was produced with the polyamic acid manufacturing system 1 having the structure illustrated in FIG. 1. A polyamic acid with a terminal acid anhydride group produced by a reaction between 4,4'-diaminodiphenyl ether and pyromellitic dianhydride was dissolved in N,N-dimethylformamide to prepare a first solution A1. The first tank 11 was filled with the first solution A1. The second tank 12 contained a second solution A2 containing p-phenylenediamine dissolved in N,N-dimethylformamide.

First, in the first combining part 20, the first solution A1 supplied by the first supply pump 15 was combined with the second solution A2 supplied by the second supply pump 16 to produce a first combined solution B. In the first reaction part 30, the first combined solution B not in contact with gas was then mixed to produce a first polymerization solution C in which the polyamic acid was dissolved. More specifically, the solution not in contact with gas was mixed in a Kenics mixer type static mixer (inner diameter 8 mm, length 335 mm) to cause a polymerization reaction. Consequently, the first polymerization solution C with a higher viscosity than the first solution A1 was produced. No bubbles were observed in the first polymerization solution C.

Example 2

In Example 2, a polyamic acid was produced with the polyamic acid manufacturing system 1 having the structure illustrated in FIG. 1. A polyamic acid with a terminal acid anhydride group produced by a reaction between 4,4'-diaminodiphenyl ether and pyromellitic dianhydride was dissolved in N,N-dimethylformamide to prepare a first solution A1. The first tank 11 was filled with the first solution A1. The second tank 12 contained a second solution A2 containing p-phenylenediamine dissolved in N,N-dimethylformamide.

First, in the first combining part 20, the first solution A1 supplied by the first supply pump 15 was combined with the second solution A2 supplied by the second supply pump 16 to produce a first combined solution B. In the first reaction part 30, the first combined solution B not in contact with gas was then mixed to produce a first polymerization solution C in which the polyamic acid was dissolved. More specifically, the solution not in contact with gas was mixed in a driven mixer (an FQ mixer, FQ40, manufactured by Sakura Seisakusyo, Ltd.) and was then further mixed in a Kenics mixer type static mixer (inner diameter 8 mm, length 335 mm) to cause a polymerization reaction. The rotation rate of the driven mixer was 350 rpm. Consequently, the first polymerization solution C with a higher viscosity than the first solution A1 was produced. No bubbles were observed in the first polymerization solution C.

Example 3

In Example 3, a polyamic acid was produced with the polyamic acid manufacturing system 1 having the structure illustrated in FIG. 1. A polyamic acid with a terminal acid anhydride group produced by a reaction between 4,4'-diaminodiphenyl ether and pyromellitic dianhydride was dissolved in N,N-dimethylformamide to prepare a first solution A1. The first tank 11 was filled with the first solution A1. The second tank 12 contained a second solution A2 containing p-phenylenediamine dissolved in N,N-dimethylformamide.

First, in the first combining part 20, the first solution A1 supplied by the first supply pump 15 was combined with the second solution A2 supplied by the second supply pump 16 to produce a first combined solution B. In the first reaction part 30, the first combined solution B not in contact with gas was then mixed to produce a first polymerization solution C in which the polyamic acid was dissolved. More specifically, the solution not in contact with gas was mixed in a Kenics mixer type static mixer (inner diameter 8 mm, length 335 mm) and was then further mixed in a Kenics mixer type static mixer (inner diameter 8 mm, length 260 mm) to cause a polymerization reaction. Consequently, the first polymerization solution C with a higher viscosity than the first solution A1 was produced. No bubbles were observed in the first polymerization solution C.

Example 4

A first polymerization solution C in which a polyamic acid was dissolved was produced in the same manner as in Example 3 except that the first solution A1 was a solution of 2,2-bis(4-hydroxyphenyl)propanedibenzoate-3,3',4,4'-tetracarboxylic dianhydride dissolved in N,N-dimethylformamide. Consequently, the first polymerization solution C with a higher viscosity than the first solution A1 was produced. No bubbles were observed in the first polymerization solution C.

Example 5

In Example 5, a polyamic acid was produced with the polyamic acid manufacturing system 1 having the structure illustrated in FIG. 1. A polyamic acid with a terminal amino group produced by a reaction between 4,4'-diaminodiphenyl ether and pyromellitic dianhydride was dissolved in N,N-dimethylformamide to prepare a first solution A1. The first tank 11 was filled with the first solution A1. The second tank 12 contained a second solution A2 containing pyromellitic dianhydride dissolved in N,N-dimethylformamide.

First, in the first combining part 20, the first solution A1 supplied by the first supply pump 15 was combined with the second solution A2 supplied by the second supply pump 16 to produce a first combined solution B. In the first reaction part 30, the first combined solution B not in contact with gas was then mixed to produce a first polymerization solution C in which the polyamic acid was dissolved. More specifically, the solution not in contact with gas was mixed in a Kenics mixer type static mixer (inner diameter 8 mm, length 100 mm) and was then further mixed in a Kenics mixer type static mixer (inner diameter 8 mm, length 235 mm) to cause a polymerization reaction. Consequently, the first polymerization solution C with a higher viscosity than the first solution A1 was produced. No bubbles were observed in the first polymerization solution C.

Example 6

Figure 5:
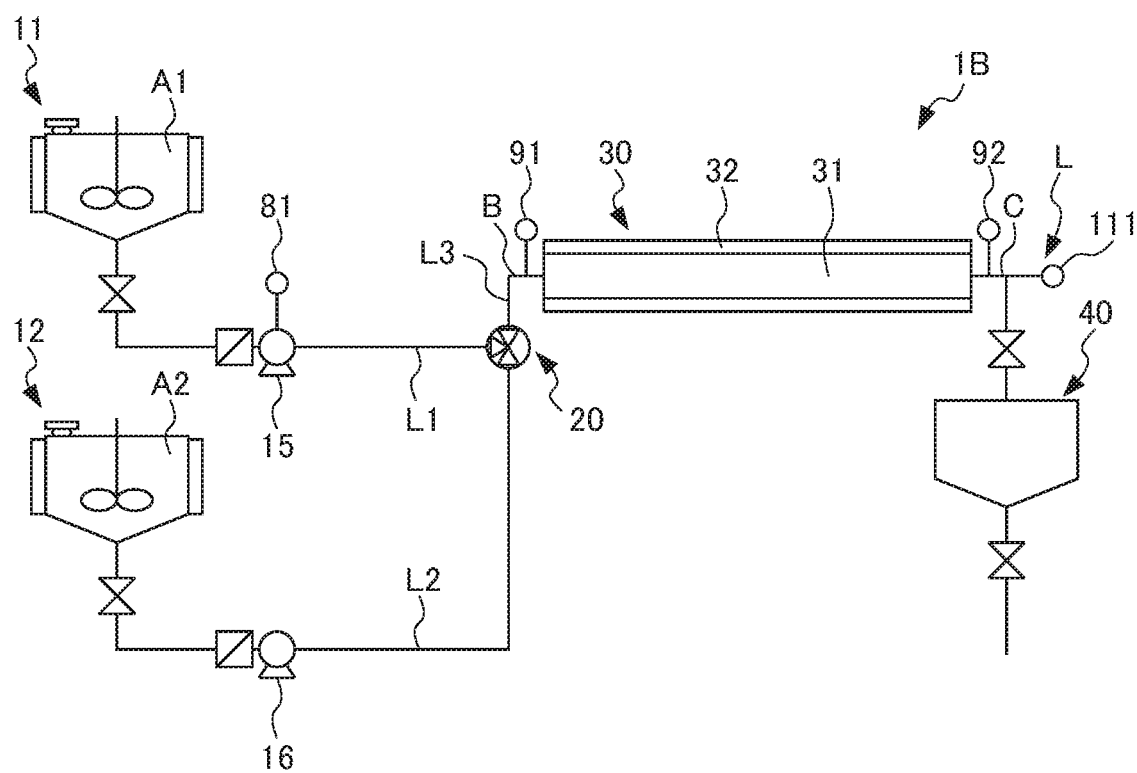
FIG. 5 is a schematic view of a polyamic acid manufacturing system according to a third embodiment.

In Example 6, a polyamic acid was produced with the polyamic acid manufacturing system 1B having the structure illustrated in FIG. 5. A polyamic acid with a terminal acid anhydride group produced by a reaction between 4,4'-diaminodiphenyl ether and pyromellitic dianhydride was dissolved in N,N-dimethylformamide to prepare a first solution A1. The first tank 11 was filled with the first solution A1. The second tank 12 contained a second solution A2 containing p-phenylenediamine dissolved in N,N-dimethylformamide. The first viscosity measurement part 111 was an in-line absorption spectrometer.

First, in the first combining part 20, the first solution A1 supplied by the first supply pump 15 was combined with the second solution A2 supplied by the second supply pump 16 to produce a first combined solution B. In the first reaction part 30, the first combined solution B not in contact with gas was then mixed in a Kenics mixer type static mixer to produce a first polymerization solution C in which the polyamic acid was dissolved.

The absorbance A of a solution is represented by the following formula (3) according to the Lambert-Beer law.

$$A = \varepsilon cl \quad (3)$$

$\varepsilon$ denotes a molar absorption coefficient, c denotes the molar concentration of the sample, and l denotes the optical path length. The absorbance of a polymerization solution produced according to a specified polymerization formula was measured off-line in advance, and a specified relationship between the absorbance and viscosity was found. More specifically, a smaller absorbance at a wavelength of 490 nm results in a higher viscosity. For a target viscosity of 3200 poises, the absorbance should be 0.178. On the basis of the measurement information that the absorbance was 0.199 (reduced viscosity: 2100 poises) while the first solution A1 and the second solution A2 were transferred, the flow ratio was changed to increase the second solution A2 and adjust the absorbance to 0.178. Consequently, the first polymerization solution C had a viscosity of 3200 poises. No bubbles were observed in the first polymerization solution C.

Example 7

In Example 7, a polyamic acid was produced with the polyamic acid manufacturing system 1B having the structure illustrated in FIG. 5. A polyamic acid with a terminal acid anhydride group produced by a reaction between 4,4'-diaminodiphenyl ether and pyromellitic dianhydride was dissolved in N,N-dimethylformamide to prepare a first solution A1. The first tank 11 was filled with the first solution A1. The second tank 12 contained a second solution A2 containing p-phenylenediamine dissolved in N,N-dimethylformamide. Two pressure gauges were installed as the first differential pressure measurement parts 91 and 92.

First, in the first combining part 20, the first solution A1 supplied by the first supply pump 15 was combined with the second solution A2 supplied by the second supply pump 16 to produce a first combined solution B. In the first reaction part 30, the first combined solution B not in contact with gas was then mixed in a Kenics mixer type static mixer to produce a first polymerization solution C in which the polyamic acid was dissolved.

The pressure drop $\Delta P$ of a laminar flow of solution passing through a circular tube can be calculated using the Hagen-Poiseuille equation represented by the following formula (4).

$$\Delta P = 32 \mu L u / D^2 \quad (4)$$

$\mu$ denotes the viscosity of the solution, L denotes the length of the tube (the distance between the two pressure gauges), u denotes the cross-sectional average flow velocity of the solution, and D denotes the diameter of the tube. $\Delta P$, L, u, and D can be obtained. Thus, the relationship between the differential pressure and the viscosity of the solution can be determined using the formula (4). The distance between two points at which the differential pressure is measured is determined in consideration of the accuracy of pressure measurement. On the basis of the relationship between the differential pressure and the viscosity, it was found that the viscosity increased linearly as the measured differential pressure decreased. For a target viscosity of 1500 poises, the differential pressure should be 0.6 MPa. On the basis of the measurement information that the differential pressure was 0.4 MPa (reduced viscosity: 600 poises) while the first solution A1 and the second solution A2 were transferred, the flow ratio was changed to increase the second solution A2 and adjust the differential pressure to 0.6 MPa. Consequently, the first polymerization solution C had a viscosity of 1500 poises. No bubbles were observed in the first polymerization solution C.

Example 8

Figure 13:
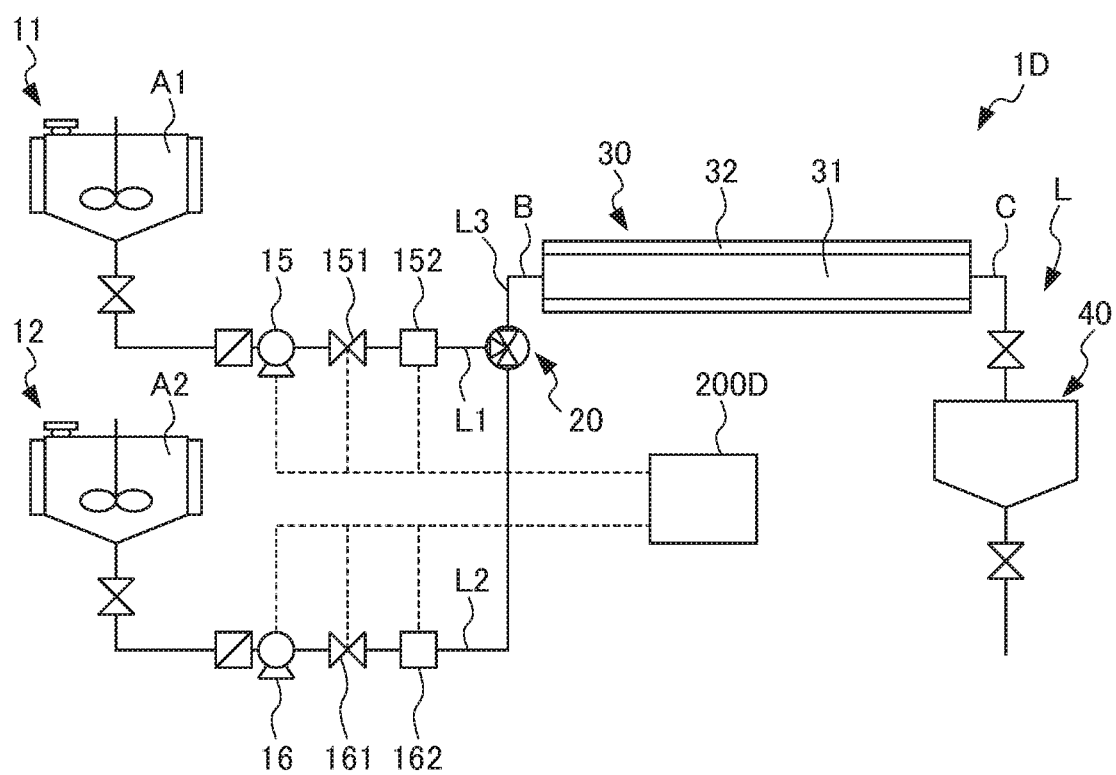
FIG. 13 is a schematic view of a polyamic acid manufacturing system according to a fifth embodiment.

In Example 8, a polyamic acid was produced with the polyamic acid manufacturing system 1D having the structure illustrated in FIG. 13. A polyamic acid with a terminal acid anhydride group produced by a reaction between 4,4'-diaminodiphenyl ether and pyromellitic dianhydride was dissolved in N,N-dimethylformamide to prepare a first solution A1. The first tank 11 was filled with the first solution A1. The second tank 12 contained a second solution A2 containing p-phenylenediamine dissolved in N,N-dimethylformamide.

First, in the first combining part 20, the first solution A1 supplied by the first supply pump 15 was combined with the second solution A2 supplied by the second supply pump 16 to produce a first combined solution B. In the first reaction part 30, the first combined solution B not in contact with gas was then mixed to produce a first polymerization solution C in which the polyamic acid was dissolved. More specifically, the solution not in contact with gas was mixed in a Kenics mixer type static mixer (inner diameter 8 mm, length 670 mm) to cause a polymerization reaction. The viscosity of the resulting polymerization solution was measured with an E type viscometer at 23° C. For the first solution A1 and the second solution A2 with synchronous flow variations, when the first flow rate variation was controlled to 1.1%, and the second flow rate variation was controlled to 3.6%, the first polymerization solution C had a viscosity of 1030 poises (the weight fraction of the polyamic acid: 21%) without variations in viscosity. No bubbles were observed in the first polymerization solution C.

Example 9

Figure 18:
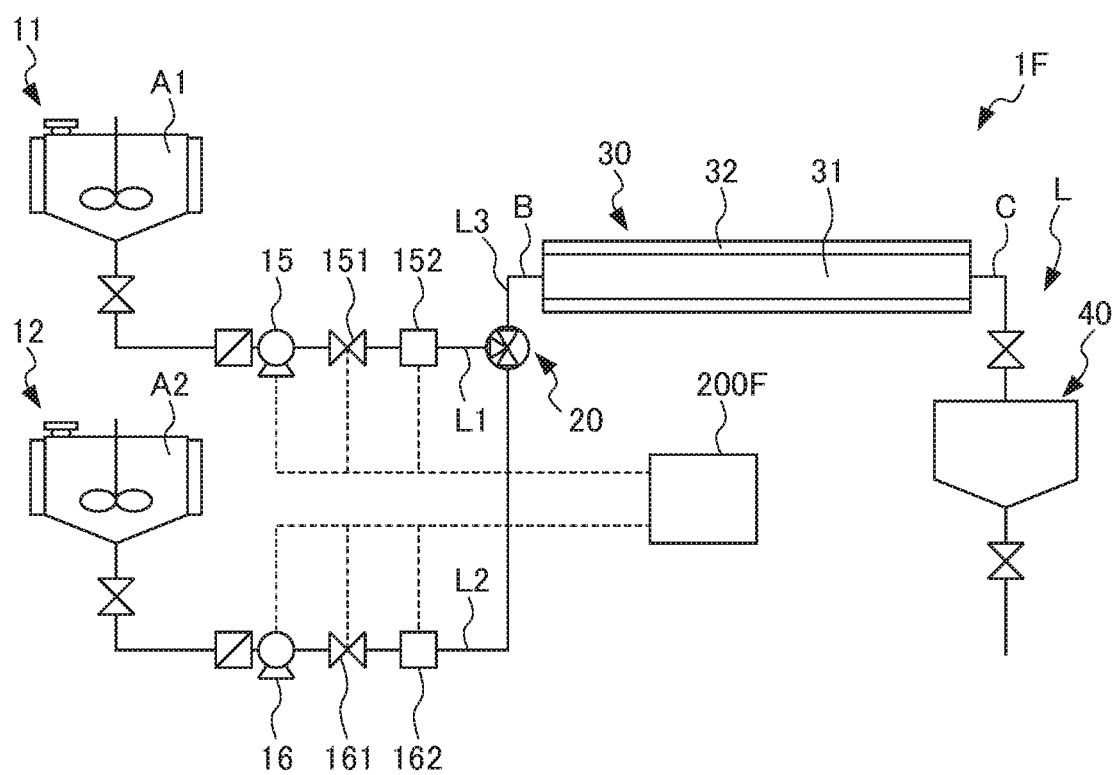
FIG. 18 is a schematic view of a polyamic acid manufacturing system according to a seventh embodiment.
Figure 19:
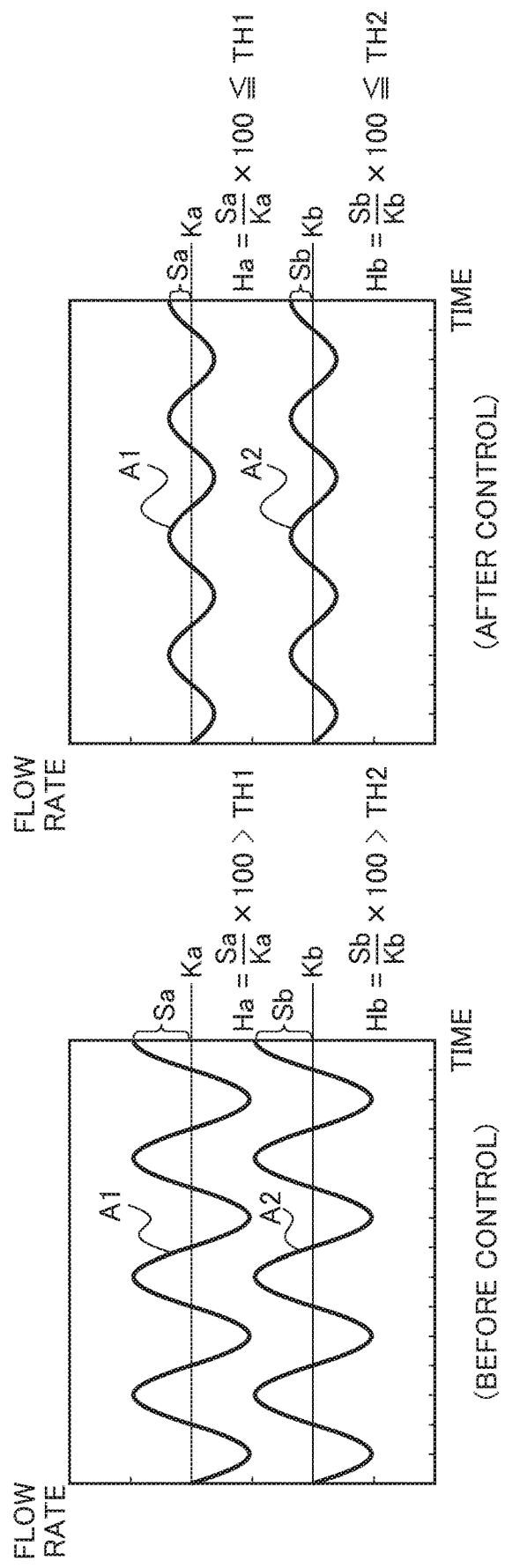
FIG. 19 is a flow waveform before or after control in the seventh embodiment.

In Example 9, a polyamic acid was produced with the polyamic acid manufacturing system 1F having the structure illustrated in FIG. 18. A polyamic acid with a terminal acid anhydride group produced by a reaction between 4,4'-diaminodiphenyl ether and pyromellitic dianhydride was dissolved in N,N-dimethylformamide to prepare a first solution A1. The first tank 11 was filled with the first solution A1. The second tank 12 contained a second solution A2 containing p-phenylenediamine dissolved in N,N-dimethylformamide.

First, in the first combining part 20, the first solution A1 supplied by the first supply pump 15 was combined with the second solution A2 supplied by the second supply pump 16 to produce a first combined solution B. In the first reaction part 30, the first combined solution B not in contact with gas was then mixed to produce a first polymerization solution C in which the polyamic acid was dissolved. More specifically, the solution not in contact with gas was mixed in a Kenics mixer type static mixer (inner diameter 8 mm, length 520 mm) to cause a polymerization reaction. The viscosity of the resulting polymerization solution was measured with an E type viscometer at 23° C. When the first flow rate variation was controlled to 0.25%, and the second flow rate variation was controlled to 0.50%, the first polymerization solution C had a viscosity of 2410 poises (the weight fraction of the polyamic acid: 20%) without variations in viscosity. No bubbles were observed in the first polymerization solution C.

Example 10

In Example 10, a polyamic acid was produced with the polyamic acid manufacturing system 1F having the structure illustrated in FIG. 18. A polyamic acid with a terminal acid anhydride group produced by a reaction between 4,4'-diaminodiphenyl ether and pyromellitic dianhydride was dissolved in N,N-dimethylformamide to prepare a first solution A1. The first tank 11 was filled with the first solution A1. The second tank 12 contained a second solution A2 containing p-phenylenediamine dissolved in N,N-dimethylformamide.

First, in the first combining part 20, the first solution A1 supplied by the first supply pump 15 was combined with the second solution A2 supplied by the second supply pump 16 to produce a first combined solution B. In the first reaction part 30, the first combined solution B not in contact with gas was then mixed to produce a first polymerization solution C in which the polyamic acid was dissolved. More specifically, the solution not in contact with gas was mixed in a Kenics mixer type static mixer (inner diameter 8 mm, length 520 mm) to cause a polymerization reaction. The viscosity of the resulting polymerization solution was measured with an E type viscometer at 23° C. When the first flow rate variation was controlled to 0.32%, and the second flow rate variation was controlled to 0.401, the first polymerization solution C had a viscosity of 5700 poises (the weight fraction of the polyamic acid: 20%) without variations in viscosity. No bubbles were observed in the first polymerization solution C.

Comparative Example 1

A polyamic acid with a terminal acid anhydride group produced by a reaction between 4,4'-diaminodiphenyl ether and pyromellitic dianhydride was put into a 3-L separable flask. While the solution in the flask was stirred with a 45-degree tilted paddle at 200 rpm, a solution containing p-phenylenediamine was added dropwise to cause a polymerization reaction of the polyamic acid. The weight fraction of the polyamic acid was 18%. The resulting polymerization solution had a viscosity of 2000 poises measured with an E type viscometer at 23° C. The solution after polymerization for 1 hour contained bubbles, which were difficult to remove even by standing.

EXPLANATION OF REFERENCE NUMERALS 1 polyamic acid manufacturing system
11 first tank
12 second tank
15 first supply pump (first supply part)
16 second supply pump (second supply part)
20 first combining part
30 first reaction part
40 first cushion tank
A1 first solution
A2 second solution
B first combined solution
C first polymerization solution
L liquid transfer line

The invention claimed is:

1. A polyamic acid manufacturing system for manufacturing a polyamic acid using, as raw materials, a first solution in which a polyaddition-type first polymerizable compound is dissolved and a second solution in which a polyaddition-type second polymerizable compound that reacts with the first polymerizable compound through polyaddition is dissolved, the polyamic acid manufacturing system comprising:
    a first supply part for supplying the first solution;
    a second supply part for supplying the second solution;
    a first combining part for producing a first combined solution by combining the first solution and the second solution in a hermetically sealed tube without contacting with a gas phase; and a first reaction part for mixing, in a hermetically sealed tube, the first combined solution not in contact with gas to cause a polymerization reaction between the first polymerizable compound and the second polymerizable compound, thereby producing a first polymerization solution in which the polyamic acid is dissolved;

a first measurement part that acquires a first viscosity information of the first polymerization solution; and a first control part that controls supply in the first supply part and/or the second supply part based on the first viscosity information, wherein the first combining part is a connecting part connecting a tubular liquid transfer line through which the first solution passes, a tubular liquid transfer line through which the second solution passes, and a tubular liquid transfer line through which the first combined solution passes, and wherein the first reaction part includes a static-type mixer.

2. The polyamic acid manufacturing system according to claim 1, wherein the first control part controls flow rate variations of the first solution and/or the second solution to decrease a difference between the flow rate variation of the first solution and the flow rate variation of the second solution.

3. The polyamic acid manufacturing system according to claim 2, wherein the first control part synchronously controls the flow rate variation of the first solution and the flow rate variation of the second solution.

4. The polyamic acid manufacturing system according to claim 1, wherein the first control part controls a flow rate variation of the first solution to a first threshold or below and controls a flow rate variation of the second solution to a second threshold or below.

5. The polyamic acid manufacturing system according to claim 1, wherein one of the first polymerizable compound and the second polymerizable compound is a tetracarboxylic dianhydride, and the other is a diamine.

6. The polyamic acid manufacturing system according to claim 1, wherein one of the first polymerizable compound and the second polymerizable compound is a polyamic acid with a terminal acid anhydride group or a terminal amino group, and the other is a diamine or a tetracarboxylic dianhydride.

7. The polyamic acid manufacturing system according to claim 1, wherein the polyamic acid in the first polymerization solution is a polyamic acid with a terminal acid anhydride group or a terminal amino group, the polyamic acid manufacturing system further comprising:

a third supply part for supplying a third solution in which a diamine or tetracarboxylic dianhydride is dissolved, the diamine or tetracarboxylic dianhydride being capable of reacting through polyaddition with the polyamic acid with the terminal acid anhydride group or the terminal amino group contained in the first polymerization solution;

a second combining part for producing a second combined solution by combining the first polymerization solution and the third solution in a hermetically sealed tube without contacting with a gas phase; and a second reaction part for mixing, in a hermetically sealed tube, the second combined solution not in contact with gas to cause a polymerization reaction between the polyamic acid with the terminal acid anhydride group or the terminal amino group of the first polymerization solution and the diamine or tetracarboxylic dianhydride of the third solution in the second combined solution, thereby producing a second polymerization solution in which the polyamic acid is dissolved, wherein the second combining part is a connecting part connecting a tubular liquid transfer line through which the first polymerization solution passes, a tubular liquid transfer line through which the third solution passes, and a tubular liquid transfer line through which the second combined solution passes, and wherein the second reaction part includes a static-type mixer.

8. A polyimide manufacturing system comprising:

the polyamic acid manufacturing system according to claim 1; and an imidization part for imidizing a polyamic acid manufactured by the polyamic acid manufacturing system.

* * * * *